United States Patent
Carlin

(10) Patent No.: US 10,552,764 B1
(45) Date of Patent: Feb. 4, 2020

(54) MACHINE LEARNING SYSTEM FOR A TRAINING MODEL OF AN ADAPTIVE TRAINER

(71) Applicant: Aptima, Inc., Woburn, MA (US)

(72) Inventor: Alan Carlin, Waltham, MA (US)

(73) Assignee: Aptima, Inc., Woburn, MA (US)

( * ) Notice: Subject to any disclaimer, the term of this patent is extended or adjusted under 35 U.S.C. 154(b) by 90 days.

(21) Appl. No.: 15/395,574

(22) Filed: Dec. 30, 2016

Related U.S. Application Data

(63) Continuation-in-part of application No. 13/872,519, filed on Apr. 29, 2013, now Pat. No. 10,290,221.

(60) Provisional application No. 61/639,565, filed on Apr. 27, 2012, provisional application No. 62/273,339, filed on Dec. 30, 2015.

(51) Int. Cl.
G06N 20/20 (2019.01)
G06N 20/00 (2019.01)
G06N 7/00 (2006.01)

(52) U.S. Cl.
CPC ............. G06N 20/00 (2019.01); G06N 7/005 (2013.01)

(58) Field of Classification Search
CPC ....... G06N 99/05; G06N 99/005; G06N 7/005
USPC ........................................................ 434/362
See application file for complete search history.

(56) References Cited

U.S. PATENT DOCUMENTS

| | | | |
|---|---|---|---|
| 6,212,510 B1 | 4/2001 | Brand | |
| 8,467,599 B2 | 6/2013 | El Dokor | |
| 8,655,822 B2 | 2/2014 | Levchuk et al. | |
| 10,290,221 B2 | 5/2019 | Stacy et al. | |
| 2002/0046202 A1* | 4/2002 | Honda | G09B 7/00 |
| 2002/0064766 A1 | 5/2002 | Cozens et al. | |
| 2002/0133391 A1 | 9/2002 | Johnson | |
| 2004/0015386 A1 | 1/2004 | Abe et al. | |
| 2004/0117624 A1 | 6/2004 | Brandt et al. | |
| 2006/0184471 A1 | 8/2006 | Minamino et al. | |
| 2006/0200333 A1 | 9/2006 | Dalal et al. | |
| 2006/0224535 A1 | 10/2006 | Chickering | |

(Continued)

FOREIGN PATENT DOCUMENTS

| | | |
|---|---|---|
| JP | 2007328507 | 12/2007 |
| WO | 2010038156 | 4/2010 |

OTHER PUBLICATIONS

Daniel Pellett, Office Action Detail for U.S. Appl. No. 14/143,410, filed Dec. 30, 2013, dated May 19, 2017, 15 pgs., USPTO.

(Continued)

*Primary Examiner* — David L Lewis
*Assistant Examiner* — Shauna-Kay Hall
(74) *Attorney, Agent, or Firm* — John J. Brooks, III

(57) ABSTRACT

In one embodiment of the invention, a training model for students is provided that models how to present training items to students in a computer based adaptive trainer. The training model receives student performance data and uses the training model to infer underlying student skill levels throughout the training sequence. Some embodiments of the training model also comprise machine learning techniques that allow the training model to adapt to changes in students skills as the student performs on training items presented by the training model. Furthermore, the training model may also be used to inform a training optimization model, or a learning model, in the form of a Partially Observable Markov Decision Process (POMDP).

18 Claims, 12 Drawing Sheets

(56) References Cited

U.S. PATENT DOCUMENTS

| | | | |
|---|---|---|---|
| 2006/0248026 A1 | 11/2006 | Aoyama et al. | |
| 2008/0260212 A1 | 10/2008 | Moskal et al. | |
| 2010/0010943 A1* | 1/2010 | Ito | G06N 3/08 706/12 |
| 2010/0010948 A1* | 1/2010 | Ito | G06N 3/0454 706/20 |
| 2011/0016067 A1 | 1/2011 | Levchuk et al. | |
| 2011/0211163 A1* | 9/2011 | Meuse | A61B 3/02 351/239 |
| 2011/0214006 A1* | 9/2011 | Meek | G06F 11/0709 714/2 |
| 2012/0076416 A1 | 3/2012 | Castellanos et al. | |
| 2012/0254333 A1 | 10/2012 | Chandramouli et al. | |
| 2013/0288222 A1* | 10/2013 | Stacy | G09B 5/00 434/362 |
| 2014/0087352 A1* | 3/2014 | Hillier | G09B 7/04 434/350 |
| 2015/0317589 A1* | 11/2015 | Anderson | G06Q 10/08 705/7.25 |

OTHER PUBLICATIONS

Misiaszek, Amber A., Office Action Detail for U.S. Appl. No. 14/207,684, filed Mar. 13, 2014, dated Aug. 8, 2017, USPTO. 24 pgs.

Misiaszek, Amber A., Advisory Action Detail for U.S. Appl. No. 14/207,684, filed Mar. 13, 2014, dated Oct. 10, 2017, USPTO. 4 pgs.

Misiaszek, Amber A., Office Action Detail for U.S. Appl. No. 14/207,684, filed Mar. 13, 2014, dated Dec. 21, 2017, USPTO. 15 pgs.

Daniel Pellett, Advisory Action Detail for U.S. Appl. No. 14/143,410, filed Dec. 30, 2013, dated Aug. 22, 2017, 5 pgs., USPTO.

Daniel Pellett, Advisory Action Detail for U.S. Appl. No. 14/143,410, filed Dec. 30, 2013, dated Oct. 19, 2017, 19 pgs., USPTO.

Daniel Pellett, Office Action Detail for U.S. Appl. No. 14/143,410, filed Dec. 30, 2013, dated Mar. 12, 2018, 26 pgs., USPTO.

Utama, Robert J., Advisory Action Detail for U.S. Appl. No. 13/872,519, filed Apr. 29, 2013, dated Sep. 7, 2016, 6 pgs., USPTO.

Utama, Robert J., Examiners Answer to Appeal Brief for U.S. Appl. No. 13/872,519, filed Apr. 29, 2013, dated Feb. 7, 2017, 17 pgs., USPTO.

Cassandra, A. (1998). A survey of POMDPS applications. American Association for Artificial Intelligence Symposium, Austin Texas, USA. 9 pgs.

Elliott, L.R., Cardenas, R., and Schiflett, S.G., 1999, Measurement of AWACS team performance in distributed mission scenarios. Available online at: http:/www.dodccrp.org/1999ccrts/pdf_files/track_3/013ellio.pdf (accessed Aug. 28, 2003), Texas, USA. 18 pgs.

Ericsson, K.A., 2002, Attaining excellence through deliberate practice: Insights from the study of expert performance. In the Pursuit of Excellence Through Education, M. Ferrari (Ed.), (Mahwah, NJ: Lawrence Erlbaum Associates, 2002), New Jersey, USA. 20 pgs.

Ericsson, K.A., 2004, Deliberate practice and the acquisition and maintenance of expert performance in medicine and related domains. Academic Medicine, 79, pp. S70-S81, USA. 20 pgs.

Ericsson, K.A., Krampe, R. TH., and Tesch-Romer, C., 1993, The role of deliberate practice in the acquisition of expert performance. Psychological Review, 700, p. 379 and p. 384., USA. 44 pgs.

Fahey, R.P., Rowe, A.L., Dunlap, K.L., and Deboom, D.O., 2000, Synthetic task design (1): Preliminary cognitive task analysis of AWACS weapons director teams. Technical Report. Brooks AFB, TX: Armstrong Laboratory, 59 pgs.

Levchuk, G.M., Gildea, K., Freeman, J., Shebilski, W., Alakke, G. and Narakesari, S., Abstract for CCRTS2007, Title: Benchmarked Experiential System for Training (BEST), presented Jun. 19-21, 2007 in Newport RI, 6 pgs.

Shebilski, W., Gildea, K, Freeman, J. and Levchuk, G., Abstract for HFES2007 Conference, Title: Training Experienced Teams for New Experiences, presented at conference Oct. 1-5, 2007 in Baltimore MD, 5 pgs.

PCT International Preliminary Report on Patentability, PCT/US2009/036865 filed Mar. 11, 2009, dated Sep. 14, 2010, Switzerland. 5 pgs.

PCT International Search Report, PCT/US2009/0368653 filed Mar. 11, 2009, dated Nov. 6, 2009, Korea. 3 pgs.

Daniel Pellett, Office Action Detail for U.S. Appl. No. 12/921,755, filed Sep. 9, 2010, dated Apr. 2, 2013, USA. 22 pgs.

R. Nair, D. Pynadath, M. Yokoo, M. Tambe, and S. Marsella, "Taming decentralized POMDPs: Towards efficient policy computation for multiagent settings," in Proceedings of the Eighteenth International Joint Conference on Artificial Intelligence (IJCAI-03), 2003, Mexico. 7 pgs.

N. Schurr, J. Marecki, J.P. Lewis, M. Tambe, and P. Scerri. The DEFACTO system: Training tool for incident commanders. In IAAI'05, 2005, USA. 8 pgs.

J. Yen, J. Yin, T. Loerger, M. Miller, D. Xu, and R. Volz. CAST: Collaborative agents for simulating teamwork. In Proceedings of International Joint Conference on Artificial Intelligence, 2001, USA. 8 pgs.

Jaakkola, T., Singh, S. P., Jordan, M. I. (1995) Reinforcement learning algorithms for partially observable Markov decision problems, Cambridge, MA, USA. 8 pgs.

X. Fan, J. Yen, "Modeling and simulating human teamwork behaviours using intelligent agents," in Physics of Life Reviews 1 (2004), pp. 173-201, University Park, PA, USA. 29 pgs.

Daniel Pellett, Notice of Allowance for U.S. Appl. No. 12/921,755, filed Sep. 9, 2010, dated Aug. 26, 2013, 19 pgs., USPTO.

Daniel Pellett, Office Action Detail for U.S. Appl. No. 14/143,410, filed Dec. 30, 2013, dated Apr. 19, 2016, 29 pgs., USPTO.

Gonzales-Brenes, Jose P. and Mostow, Jack. Dynamic Cognitive Tracing: Towards Unified Discovery of Student and Cognitive Models. International Educational Data Mining Society, Paper presented at the International Conference on Educational Data Mining (EDM) (5th, Chania, Greece, Jun. 19-21, 2012). Project Listen—Carnegie Mellon University , 8 pgs.

Chi, Min; Koedinger, Kenneth; Gordon, Geoff; Jordan, Pamela and Vanlehn, Kurt. Instructional Factors Analysis: A Cognitive Model for Multiple Instructional Interventions. Proceedings of the 4th International Conference on Educational Data Mining. Eindhoven, the Netherlands. 2011, 10 pgs.

Anker, T., D. Dolev, and B. Hod "Belief Propagation in Wireless Sensor Networks—A Practical Approach", Proceedings of the 3rd International Conference on Wireless Algorithms, Systems, and Applications, Oct. 26-28, 2008, pp. 466-479, 5258, Springer Berlin Heidelberg, Dallas Texas, USA, 14 pgs.

Crick, C., A. Pfeffer "Loopy Belief Propagation as a Basis for Communication in Sensor Networks", UAI'03 Proceedings of the Nineteenth conference on Uncertainty in Artificial Intelligence, Aug. 7, 2002, pp. 159-166, Morgan Kaufmann Publishers Inc. San Francisco, CA, USA, 8 pgs.

Elidan, G., I. McGraw, and D. Koller "Residual belief propagation: Informed Scheduling for Asynchronous Message Passing", Proceedings of the Twenty-second Conference on Uncertainty in AI (UAI), 2006, pp. 165-173, AUAI Press, Boston, MA, USA, 9 pg.

Haupt, J., W. U. Bajwa, M. Rabbat, and R. Nowak "Compressed Sensing for Networked Data", IEEE Signal Processing Magazine, Mar. 2008, pp. 92-101, vol. 25, IEEE, New York, NY, USA, 10 pgs.

Malewicz, G., M. Austern, A. Bik, J. Dehnert, I. Horn, N. Leiser, and G. Czajkowski "Pregel: a system for large-scale graph processing", Proceedings of the 2010 ACM SIGMOD International Conference on Management of data, Jun. 6-11 2010, pp. 135-146, ACM, New York, NY, USA, 11 pgs.

Pfeffer, A., T. Tai "Asynchronous Dynamic Bayesian Networks", Proceedings of the Twenty-First Conference on Uncertainty in Artificial Intelligence, Jul. 26-29, 2005, pp. 467-476, AUAI Press, Arlington, VA, USA, 10 pgs.

Sutton, C., and A. McCallum "Improved Dynamic Schedules for Belief Propagation", Proceedings of the Twenty-third Conference on Uncertainty in Artificial Intelligence (UAI), Jul. 19-22, 2007, pp. 376-383, AUAI Press, Boston, MA, USA, 8 pgs.

(56) References Cited

OTHER PUBLICATIONS

Brocheler, M., A. Pugliese, V. P. Bucci, and V. S. Subrahmanian "COSI: Cloud oriented subgraph identification in massive social networks", International Conference on Advances in Social Networks Analysis and Mining, Aug. 9-11, 2010, pp. 248-255, IEEE, New York, NY, USA, 8 pgs.
Bertsekas, D., R. Gallager "Data Networks", 2nd edition, 1992, pp. 432-447. 1Prentice-Hall Inc., Upper Saddle Rive, New Jersey, USA, 16 pgs.
Utama,Robert J., Office Action Detail for U.S. Appl. No. 13/872,519, filed Apr. 29, 2013, dated Dec. 7, 2015, USPTO. 10 pgs.
Utama, Robert J., Office Action Detail for U.S. Appl. No. 13/872,519, filed Apr. 29, 2013, dated Jun. 20, 2016, USPTO. 11 pgs.
Misiaszek, Amber A., Office Action Detail for U.S. Appl. No. 14/207,684, filed Mar. 13, 2014, dated Jan. 5, 2017, USPTO. 19 pgs.
Freeman, J., Stacy, W., Olivares, O., Assessment for Learning and Development in Virtual Environments. Schmorrow, D., Cohn, J., & Nicholson, D. (Eds.), The PSI handbook of virtual environments for training and education: Developments for the military and beyond. Westport, CT: Praeger Security International, 2009.
Pellett, Daniel, Advisory Action Detail for U.S. Appl. No. 14/143,410, filed Dec. 30, 2013, dated Jun. 12, 2018, 6 pgs., USPTO, Alexandria, VA, US.
Misiaszek, Amber A., Office Action Detail for U.S. Appl. No. 14/207,684, filed Mar. 13, 2014, dated Aug. 9, 2018, 19 pgs., USPTO. Alexandria, VA, US.
Brooks, John, Pre-Appeal Brief Request for Review for U.S. Appl. No. 14/143,410, filed Dec. 30, 2013, submitted Jul. 12, 2018., 7 pgs., Woburn, MA.
Utama, Robert J., Decision on Appeal for U.S. Appl. No. 13/872,519, filed Apr. 29, 2013, dated Oct. 11, 2018, 9 pgs., USPTO,Alexandria, VA, US.
Misiaszek, Amber A., Advisory Action Detail for U.S. Appl. No. 14/207,684, filed Mar. 13, 2014, dated Dec. 12, 2018, USPTO. 13 pgs.
Almond, Russell G. An illustration of the use of Markov decisions porcesses to represent student growth (learning).: ETS Research Report Series 2007.2 (2007): 1-61. (Year:2007).
Kaelbling, Leslie Pack, et all. "Planning and acting in partially oberservable stochastic domains." Artificial Intelligence 101.1-2 (1998): 99-134. (Year: 1998).
Pellett, Daniel, Advisory Action Detail for U.S. Appl. No. 14/143,410, filed Dec. 30, 2013, dated Jul. 30, 2019, 28 pgs., USPTO.

* cited by examiner

216B

Student 242

| Question # | Rater Input | KPA | Objective | Possible Score | Awarded Score |
|---|---|---|---|---|---|
| Item 1A1 |  | 8 | 4 | 3 |  |
| Item 1A2 |  | 8 | 2 | 3 |  |
| Item 1A3 |  | 8 | 6 | 3 |  |
| Item 1A4 | TRUE | 8 | 1 | 1 | 1 |

| Student ID | Name | Item Name | Called AOB | Actual AOB | Call Side | Call time | OAB Feedback | User Error | Trial Skill | Next Skill |
|---|---|---|---|---|---|---|---|---|---|---|
| 1 | Joe | 4897 | 25 | 50 | 2 | 52811 | 1 | 0 | Med. | Med. |
| 1 | Joe | 2342 | -165 | 9 | 1 | 20132 | 2 | 0 | Med. | Med. |
| 1 | Joe | 9187 | -155 | -168 | 1 | 33275 | 1 | 0 | Med. | Med. |

| Row # | Error | Full Credit Threshold | Part Credit threshold | Score |
|---|---|---|---|---|
| 2 | 25 | 15 | 30 | 2 |
| 3 | 174 | 15 | 30 | 1 |
| 4 | 13 | 15 | 30 | 3 |

| Student ID* | Item ID* | Sequence # | Measure 1 | Measure 2 | ... Measure n | Student Skill A Level | Student Skill B Level |
|---|---|---|---|---|---|---|---|
| Student 999 | Item 1A1 | 1 | Pass | 987.11 | Right | Novice | Novice |
| Student 999 | Item 1A2 | 2 | Fail | 24.44 | Left | Novice | Intermediate |
| Student 999 | Item 1A3 | 3 | Pass | 107.44 | Left | Novice | Intermediate |
| Student 999 | Item 1A4 | 4 | Pass | 99.44 | Left | Intermediate | Expert |

FIG. 2E

Initialization:

- N := Number of skills in training domain % KSA (represented as n in equation 1b)
- $d_{\{max\}}$ := Highest possible level of difficulty %predefined parameter value
- Scores := All item scores for correctness %performance data
- For each training item i %item
    - For k = 1 to N
        - $a_k^i := 0$ %initial value
    - Rand1 := random number between 1 and N
    - $a_k^i := 1$
    - rand2 := random number between 1 and $d_{\{max\}}$
    - $d^i :=$ rand2
    - for before_skill = 1 to N
        - for after_skill = 1 to N
            - if after_skill == before_skill
                - trans_init(before_skill, after_skill) = .95
            - else if after_skill == before_skill + 1
                - trans_init(before_skill, after_skill) = .05
            - End if
        - End for
    - End for
- End for
- For each student s
    - For each time-step t in the student training sequence
        - $\theta_k^t(s) := 1$ for all k %initialize the interpretation that the student was a novice at all times (skill levels)
    - End for
- End for Copyright Aptima, Inc. 2016, All Rights Reserved.

Sampling:

- NUM_ITERATIONS := number of iterations to run the algorithm
- BURN_IN := NUM_ITERATIONS/2;  %first several iterations are just to stabilize the algorithm
- for iter := 1 to NUM_ITERATIONS  %the steps are performed sequentially where values from one step feeds a later step
    - d := sample_difficulty(scores, a, theta);  %solved for using Equation 1 and Equation 3 above
    - a := sample_a(scores, theta, d);
    - theta = sample_theta(scores, a, d, trans);
    - trans = sample_trans(theta);
    - if iter > BURN_IN  %counting to help determine average
        - d_sum += d;
        - a_sum += a;
        - theta_sum += theta;
        - trans_sum += trans;
    - End if
- num_samples = NUM_ITERATIONS – BURN_IN  %a threshold
- d_avg := d_sum/num_samples  %learned training measure
- a_avg := a_sum/num_samples  %learned KSA
- theta_avg := theta/num_samples;  %learned student skill level
- trans_avg = trans/num_samples;  %learned item effectiveness
- End for Copyright Aptima, Inc. 2016, All Rights Reserved.

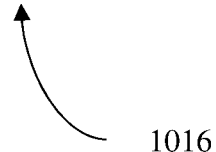 1016

FIG. 10

MACHINE LEARNING SYSTEM FOR A TRAINING MODEL OF AN ADAPTIVE TRAINER

CROSS-REFERENCE TO RELATED APPLICATIONS

This application claims the benefit of U.S. Pat. App. No. 62/273,339 filed on Dec. 30, 2015, entitled "SYSTEMS AND METHODS FOR AUTOMATED LEARNIING"; this application is a continuation in part of U.S. patent application Ser. No. 13/872,519, filed on Apr. 29, 2013, entitled "SYSTEMS AND METHODS TO CUSTOMIZE STUDENT INSTRUCTION"; U.S. patent application Ser. No. 13/872,519 claims benefit of U.S. Pat. App. No. 61/639,565, filed on Apr. 27, 2012, entitled "SYSTEM, METHOD AND PROCESS FOR AUTOMATICALLY CREATING A MODEL OF LEARNING A DOMAIN"; and the entire contents of which are incorporated herein by reference.

STATEMENT REGARDING FEDERALLY SPONSORED RESEARCH OR DEVELOPMENT

This invention was made with Government support under Contract # N00014-12-G-0545 0011 awarded by the U.S. Navy. The U.S. Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to data processing and artificial intelligence, in particular this invention relates to utilizing machine learning to define variable values of a training model in a computer based adaptive training system.

2. Description of the Prior Art

In the field of Artificial Intelligence, it is difficult for automated systems to assess student competency in the context of an environment in which the student competency may be changing. Furthermore, education systems that rely on educational data mining models are not tightly related to software that optimizes training.

Development of training and training tools typically starts with manual task analysis or knowledge elicitation sessions, and these require a fair amount of time from both training professionals and subject matter experts (SMEs). The materials developed from those sessions is then manually transformed into a set of knowledge, skills, and abilities (KSAs) and training objectives (TOs), and instructional content, lectures, scenarios, items, actions, simulations, etc., are subsequently developed for each. In the best of cases, one or more performance metrics are manually developed for each TO, and an interpretation for those metrics and assessments is also manually developed. Even though the training content, metrics, and assessments differ between didactic and experiential training environments, the development process is quite similar and equally labor intensive. This approach requires extensive time and effort, and, even with this effort, it rarely produces training content that "fits" student needs well, training plans that adapt easily to individual students, or performance metrics that assess student state with precision.

Item Response Theory (IRT) is a framework for assessing student performance, but it does not address the fact that the performance may change. Hidden Markov Models (HMMs) (used in approaches such as Bayesian Knowledge Tracing (BKT)) are a framework for tracking the changes in student performance over time, but it does not have the fidelity of an IRT model, nor does it handle multiple complex measures well, nor does it handle multiple skills.

BRIEF SUMMARY OF THE INVENTION

The following summary is included only to introduce some concepts discussed in the Detailed Description below. This summary is not comprehensive and is not intended to delineate the scope of protectable subject matter.

In some embodiments, the systems and methods for automated learning provides a tool that learns a training model from historical performance data, and may also optimize training based on this model. These systems and methods streamline preparation of training, which to date has been a manual, labor-intense process.

In one embodiment of the invention, a training model is a set of selected parameters and variables that have a relationship between them. The training model parameters and variables are selected such that the model (1) represents how underlying student skills change over time and (2) represents how performance data is related to the underlying student skill levels, the item difficulties and the item applicabilities. Because the training model represents how student skills are related to performance data, we typically use it by inputting performance data, and using the model to infer underlying student skill levels throughout the training sequence. This is a novel model of Educational Data Mining (EDM).

The training model may capture both transient measures and information about student progression, and combine the two. It may combine information that comes from (multiple) student measures as they are acquired over time (not just one measure as in typical IRT), about student progression under multiple different possible items (not just one item as in typical HMMs), and can handle training domains with multiple skills, not just one skill as with typical IRT and HMM approaches.

Furthermore, the learned training model may be used to inform a training optimization model, or a learning model, in the form of a Partially Observable Markov Decision Process (POMDP). In other words, in some embodiments of the training model can be used to receive training data, or performance measures from a student, and output a training model suitable for use with learning model such as may be part of a POMDP adaptive training system. The learning model may provide a diagnostic tool for learning management systems that models the learning of and a student's progression within a learning domain. This model goes beyond identifying the primary constructs of the learning domain and may represent the different states of learning and mastery that users will undergo in their pursuit of the learning the domain curricula.

In some embodiments that include both the training model and the learning model, systems and methods for automated learning may receive training data from one or more students and, through the use of the training model and the learning model, output training recommendations for the one or more students.

There are several difficulties in the development of training and training tools that the disclosed solution may address. First, it has been difficult to address how to handle a training domain with multiple skills. Second, it has been difficult to address how to assess student performance when that performance changes over time, and involves multiple skills, without knowing the training that the student will encounter, because most students do not encounter the same sequence of training.

The advances provided by these methods and systems in turn should benefit students, instructors, and institutions. Trainees will learn faster and retain the knowledge longer because their training events are selected using accurate models of what each has learned, has not yet learned, can learn, and must learn (i.e., their current, future, and goal knowledge states). Trainees will also advance more rapidly because training material is more accessible and complete. Instructors will make better feedback and remediation decisions because they receive automated estimates of the current and future states of students. Instructors will also improve their feedback and remediation decisions because they can calibrate their assessment skills against automated estimates. Institutions will reduce the costs of implementing the standard design and evaluation process because aspects of the process are automated. Particularly strong effects will occur in continuous quality improvement (evaluation and redesign of training) as training data accumulate over time and analysis of those data because a standard procedure.

In some embodiments, components of the systems and methods of automated learning may further comprise systems and methods of automatically measuring the performance of students to provide training data.

In some embodiments, the systems and methods of automated learning may be integrated into computer based systems, such as computer based training simulators or other computer based training systems.

Example embodiments of the systems and methods disclosed may provide a convenient approach to tailoring computer-delivered instruction to individual students. This may be done without the need for a human instructor to be involved in the instruction, assessments or training item/scenario selection. Some embodiments allow instructional designers to use existing data based on student performance to automatically build a training model of the state of a students' knowledge during the course, and to use the training model to automatically select the best instructional material to present to each student, given their current state of knowledge. This results in computer-based instruction that provides, tailored to each individual student, the best instructional path through the lesson and the course. In some embodiments, the disclosed systems and methods may be utilized to tailor computer-delivered instruction to students in Massively Open Online Courses (MOOCs).

In some embodiments, a computer implemented method of automated learning is provided, the method generally comprising receiving a performance data and learning a training model from the performance data. The performance data may be of a student, past students or estimated values to initialize the model. In some embodiments, the training model comprises a plurality of model parameters and variables and each of them having one or more training module parameter values or variable values. The training model parameters generally define the relationships between model components such as between parameters, between variables and between parameters and variables. The parameters may be predefined but the parameters may have values or may have parameter variables with values that change as the model is used and adapts. In some embodiments, the plurality of model parameters comprises a skill, a skill level, a training item, a training measure, a transition function and an observation function. In some embodiments, the training model parameters values or parameter variable values may be automatically learned by a machine learning. The training model variables are more dependent upon the user or student in that the variable values reflect traits of the user. In some embodiments, the training model variables comprise a skill level of the user and a training measure of the user. The model variables may be predefined as a training model parameter but the values of the variables change as the student uses the adaptive trainer.

In some embodiments, the systems and methods may further comprise providing the resulting parameter and variable values from the training model to a learning model. The learning model may determine an instructional model and provide training recommendations to the user based upon the instructional model. In some embodiments, the learning model comprises a POMDP model.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B shows an example of the structure of the DRI training data;

FIG. 2C shows an example of the structure of the periscope training data;

FIG. 2D shows an example of a scoring rubric illustration (score is incorrect if error is greater than both thresholds, correct if error is less than both thresholds, and partially correct if the error is greater than one threshold but less than the other);

FIG. 2E shows an example training model input ontology;

FIG. 9 illustrates an example embodiment of a method of determining an initial set of values for variables and parameter variables without knowing actual values; and FIG. 10 illustrates an example embodiment of sampling code showing how values for variables and parameter variables are learned.

DETAILED DESCRIPTION OF THE INVENTION

Figure 1A:
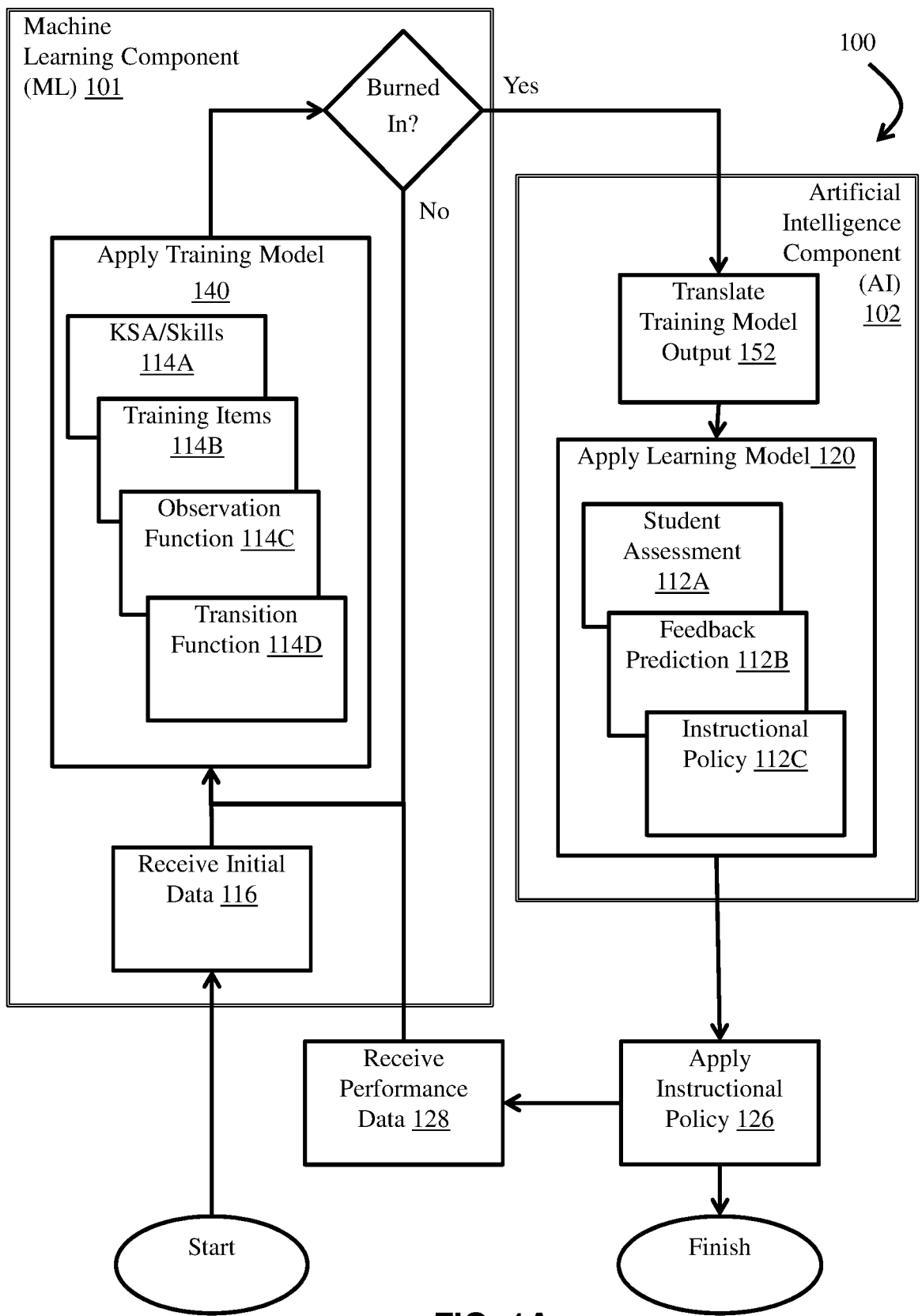
FIG. 1A shows a shows a process diagram illustrating the general concepts of one embodiment of the automated learning systems and methods disclosed.

Systems and methods to automate learning will now be described in detail with reference to the accompanying drawings. It will be appreciated that, while the following description focuses on a system that automates learning and builds a training model with machine learning, the systems and methods disclosed herein have wide applicability. Notwithstanding the specific example embodiments set forth below, all such variations and modifications that would be envisioned by one of ordinary skill in the art are intended to fall within the scope of this disclosure.

The methods for automated learning generally comprise performing machine learning with a Machine Learning (ML) component that generates a populated training model and training model parameters and the methods then map some of those parameters to an Artificial Intelligence (AI) component to produce an Instructional Policy. The ML component generally includes parameters and methods that are used to determine information from a user/student in a trainer such as the student's performance and skill levels. The AI component generally defines an instructional policy that selects a next training item/scenario to present to a user/student. When used together, and when properly "trained", the ML and AI components may be able to autonomously provide training to user/students that most efficiently recognize the skill level of the user/student and most efficiently present the next training item/scenario to meet their training needs. Allowing the ML component to learn component parameters provides a trainer that is able to adapt over time and use so that the trainer more accurately reflects the user/student and the actions/scenarios used by the trainer.

When used with a computer based adaptive trainer, such as a computer based training simulator, the methods for automated learning provide an unconventional and specific software based method of learning parameters of a training model. These embodiments address the technical issue specific to computer based training simulators of how to build training models in computer based simulators so that they can change as the simulator and the training model is used by users/students. These automated learning methods are an unconventional method of providing a computer based simulator that can adapt and become more accurate as it is used more by users/students. These features are important in situations such as, but not limited to having a poor initial source of training model parameters in the training model, having a user/student population that changes over a period of time and having a training model that incorporates a broad user/student population or a large pool of actions/classes. Additionally, when the training model is used with an AI based instructional policy, the learning of the training model and the use of the instruction policy can provide an autonomous training simulator with little if any need of input outside of the input/observations of the user/student.

As described in more detail below, embodiments of these methods for automated learning of training models with adaptive trainers improve the functionality of computer based trainers by providing methods whereby the trainer can adapt and become more accurate as it is used more by users/students.

The application of these methods to computer based trainers is an unconventional solution. To date, the application for machine learning methods such as of Item Response Theory (IRT) has been focused on computer adaptive testing (CAT), particularly in high-stakes testing applications, such as the SAT standardized test used for college admissions. CAT testing assumes that student ability is unchanging and (in the case of IRT) is dependent on only one skill. In testing, a common adaptive approach is to select a next item that the student has a 50 percent likelihood of answering successfully, based on known item difficulty and the current estimate of the test-taker's proficiency. In this testing environment, the adaptation is not directed to more efficient training but to customize a selection of the next question based on the student's previous performance. The goal in testing is to determine an optimal assessment of the maximum level of item difficulty that the test-taker can answer correctly as an assessment for that student on that skill. In contrast, the adaptive training environment has a different objective than that of testing. The goal of an adaptive trainer is to optimize learning by presenting training content that is most likely to increase the learner's current level of expertise. The adaptive training environment recognizes that the student's ability can change and recognizes that change can be impacted by the training content that is selected. For example, in one embodiment, an optimal strategy for an adaptive trainer would be to choose upcoming items that are in the Zone of Proximal Development (ZPD) for the current estimated proficiency of the trainee. Slightly more difficult items may be identified as those that the student is expected to have a 70 percent chance of successfully responding to correctly. It would also be effective for training to have sets of items that have differences but are also similar in ways relevant to the training as well as relatively equivalent in difficulty, and to randomly choose from among this set of items.

Another difference in extending the use of IRT methods to adaptive training is in the amount of data needed for item calibration. Studies examining the interactive influences of test length and sample size, have considered sample sizes of 200, 500, and 1,000, and found that samples of 200 produced unacceptable results. The larger sizes are consistent with typical recommendations for IRT calibration that are helpful to provide sufficient accuracy for testing and the decisions that are based on testing outcomes. However, in adaptive training applications, the stakes in establishing item difficulty are considerably lower, and thus, the potential benefits to be gained in applying this adaptive approach will outweigh the risks that trainees may be presented with items (that is, training content) that may not be as precisely matched to the trainee's level of expertise as might be possible with more accurate calibration.

Scientists have been trying to automatically create models used by Intelligent Tutoring Systems for decades, with little success. However, combining 1) a PCA and HMM-based method to define a knowledge ontology that integrates as learned domain knowledge with 2) an IRT-based method for estimating and scoring item difficulty uniquely combines mathematical approaches typically used in very different domains, namely knowledge elicitation and high-stakes personnel selection.

The improvements provided by the adaptive trainer training models disclosed herein use specific mathematical models to implement a specific ordered combination of steps to provide specific and unconventional results and overrides the routine and conventional events triggered by normal use of computer based trainers.

One Embodiment of Methods for Automated Learning of a Training Model of an Adaptive Trainer:

For illustration purposes and not for limitation, one example embodiment of methods for automated learning of a training model of an adaptive trainer is shown in FIG. 1A. As shown 1A, the method for automated learning generally comprises performing machine learning with a Machine Learning (ML) component 101 that generates a training model populated with values for variables and parameters variables, and the methods then map some of those values to an Artificial intelligence (AI) component 102 to produce an Instructional Policy 112C. The ML component 100 parameters include parameters such as performance data or training measures, skills 114A, skill levels, training items 114B (also called items, scenarios and action), transition functions 114D (also called the "scenario effectiveness measures", the "training item effectiveness measures" and the "transitional probabilities"), scenario description data. (also called the training item description data and including the difficulty and applicability of each training time or scenario to each skill), observation functions 114C, etc. The ML component 101 variables comprise performance data or training measures for a user and the skill level of the user. The AI component 102 may comprise a Partially Observable Markov Decision Process (POMP). With the translation of the training model values into a POMDP model, the POMDP may be translated into an instructional Policy 112C to issue training recommendations.

Figure 2A:
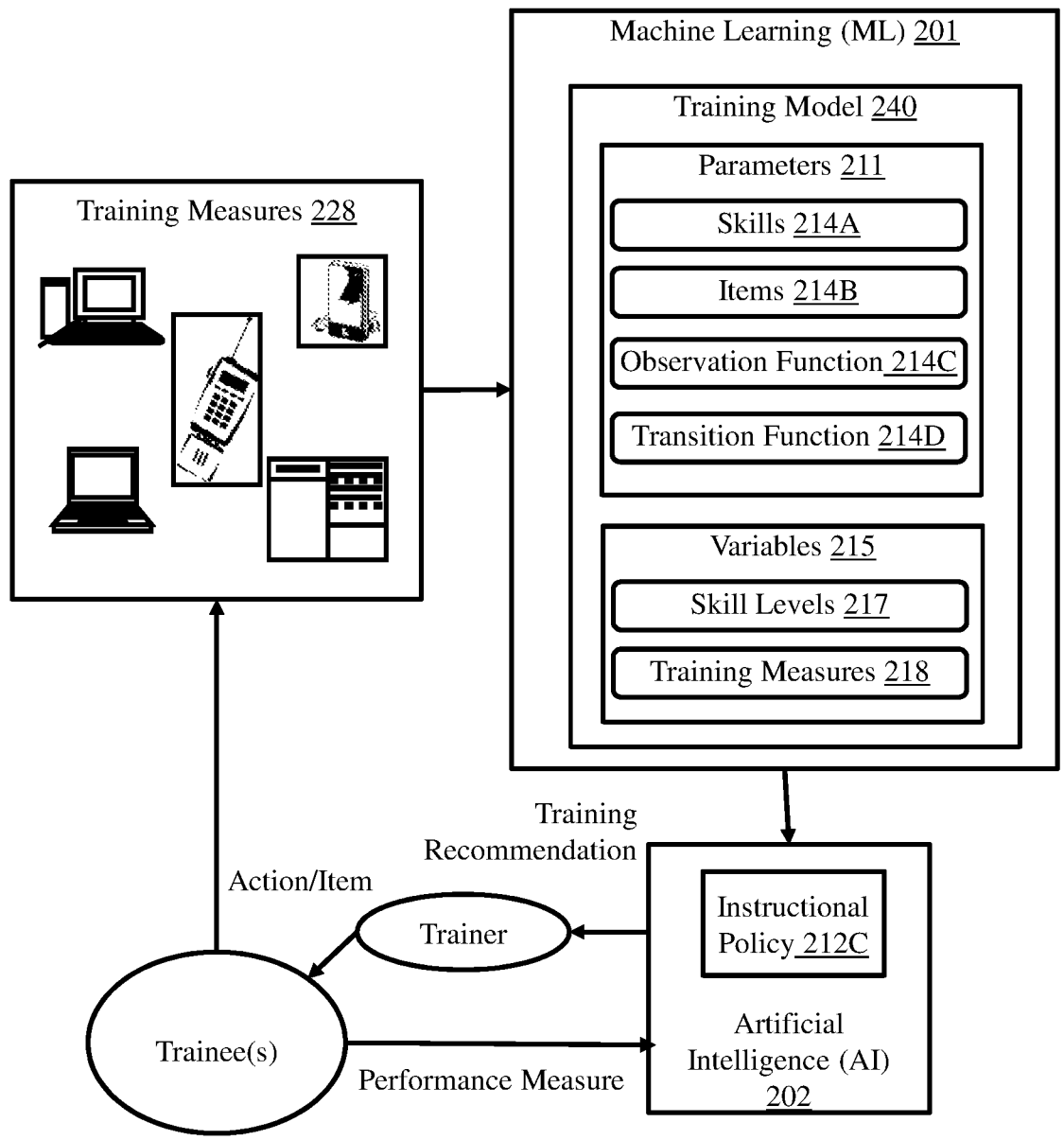
FIG. 2A shows an example embodiment of an automated learning model in context.

For illustration only and not for limitation, FIG. 2A illustrates a functional overview of one example embodiment of an adaptive trainer, the Higher Automated Learning (HAL) approach or the HAL methods and systems. The HAL methods and systems operate on training measures that can be provided as initial values or they may be collected as used perform to training items. Throughout this disclosure, we refer to a training "scenario" or "item" or "action" to represent any type of training event or sequence of events. For example, and not for limitation, a training "scenario" may be an exercise or a module in computer-based training, etc.

The HAL methods generally comprise two functional components shown in FIG. 2A: a Machine Learning (ML) component 201 and an Artificial Intelligence (AI) planning component 202. The ML component includes training model variables 215 and training model parameter variables 211 and sometimes generates the values for each of these variables. That is, the ML component information about student skills 214A, training items 214B, measures 218, etc. Some of these parameters are then used by the AI component 202 to populate the learning model also called an Instructional Policy 212C. The resulting Instructional Policy 212C may be used to interact with the student in a repeated sequence. The interaction may be in near-real time. Within the sequence, the Instructional Policy 212C selects a training item 214A which is given to the user/student. The user performs on the exercise and as they do so, performance measures values are captured. The performance measure values are conveyed back to the Instructional Policy 212C, which uses them to (1) update its assessment of the student, (2) determine a training recommendation for the student and (3) convey a training recommendation back to the student.

In some embodiments, the machine learning system is also able to generate its own set of values for training model parameter variables or update these parameter variable values from performance data values of the user(s). This can be helpful to capture an initial set of parameter variable values or to capture changes in the values over a period of time making the training model and the adaptive trainer more effective.

The resulting systems and methods provide an intelligent diagnostic tool for adaptive learning management systems that represent a student's progression within the learning domain. The methods leverage automated model learning of the domain and the method's representation of a student's progress goes beyond identifying the primary constructs (e.g., skills, training objectives, etc.) of the domain and more actually represents the learning path that students follow in their pursuit of the domain curricula. This deeper understanding of learning within the domain supports training and development through the automatic generation of individually meaningful metrics and assessments. Benefits of this approach include the following: the input requirement is data in a minimal ontology; the core knowledge components (parameter variable values) of the domain can be automatically learned, they do not have to be specified by Subject Matter Experts (SMEs); the approach is flexible enough to utilize limited information provided by SMEs, and to learn the remaining aspects of the domain; the approach uses sequential optimization approaches (POMDP and HMMs) to develop a model of trainee learning paths; and the approach combines its model of trainee learning paths with IRT, a method that yields a direct assessment of student capabilities and item difficulties, given performance scores.

Other examples of systems and methods of customizing student instruction with AI and Instructional Policies include those disclosed in U.S. Pat. No. 8,655,822 to Georgiy Levchuk entitled "PROBABILISTIC DECISION MAKING SYSTEM AND METHODS OF USE" issued on Feb. 18, 2014 and pending U.S. patent application Ser. No. 14/143, 410 to Georgiy Levchuk et al. entitled "PROBABILISTIC DECISION MAKING SYSTEM AND METHODS OF USE" filed on Dec. 30, 2013. Both the patent and the application are incorporated herein by reference in their entirety.

In FIG. 2A, we show an optional Trainer/Instructor in the loop. In this configuration, the Instructional Policy 212C conveys the training recommendation to the trainer, who then uses this recommendation to select training for the user. It is possible to perform training without the explicit presence of a trainer/instructor, by removing this component from the diagram and having the instructional policy 212C directly connect to the user, by automated the implementation of instructional selection.

One Example Embodiment of an Adaptive Trainer:

Machine Learning (ML) System:

The function of the machine learning system for a training model of an adaptive trainer is generally configured to learn and apply a training model with received performance data. The training model comprises information about a training domain and includes parameters and variables such as student skills, training item (e.g. training scenarios), measures, etc. The training model receiving the performance or training data as an input to a set of training model variables and parameters to output values of the training model. In one embodiment, as shown in FIG. 2A, the training model of the adaptive trainer may generally comprise the parameters such as skills (with predefined skill levels), training items (with item applicability and item difficulty variables), observations functions and transition functions. The training model may also comprise variables such as skill levels and training measures for the trainer user.

The training item parameter represents the item, scenario or action to be provide to a user of the adaptive trainer. The training items comprises parameter variables (meta-data) such as the item applicability and the item difficulty of each training item to each skill. The more applicable a training item is to a skill, the more the student's skill level on that skill influences whether a student will get the item right or wrong. The more difficult a training item is to a skill, the lower the chance that the student will be scored positively on the item. These parameter variables are given values within the training model to reflect the applicability and the difficult of the training item.

The skill parameter with respect to skills from the skill list, represents the range of skills for each training item within the training model. Values of the skill parameter may be an identification of each skill from the list of skills.

The transition function parameter is a probabilistic representation of the relationship between the delivery of the training item to the user and the likelihood that the user will change skill levels. The transition function includes information regarding the likelihood that presentation of the training item will advance student skill level with respect to each skill. In one embodiment, each pair of skill levels before and after the student takes the training item, is assigned a probability from zero to one hundred percent. A transitional probability is defined as the probability that a student at a pre-exercise level on a certain skill will transition to a post-exercise level on the same skill, as a result of the training exercise. In some embodiments, a rubric automatically constructs a transitional probability on each skill, based on the item difficulty and applicability. In this rubric, the more applicable a training item is to a skill, and the more closely the difficulty level of a training item matches the student's skill level on that skill, the higher the transitional probability for increases in skill level.

The observation function defines the relationship between the performance data and the student's skill levels for a skill. For example, the observation function defines the relationship between a performance measure on item t ($o^r$) and the skill level of that item of skill k ($\theta_k^t$ (for all k)).

The skill level variable, with respect to skills from the skill list, represents the underlying range of skill levels that each user can have with respect to each skill from the predefined skill levels at the time of each training exercise. The value of this variable represents the skill level of a user for that skill. The training model is configured to find the most likely possible assignment of skill level values. In one embodiment, the training model assumes a default of Novice/Intermediate/Expert as the three possible skill level values.

The training measure variable represents the measure of a user's performance on a training item. The value of this variable represents the specific measure of that user's performance. For example, the training measure value may be a pass/fail value or it may be a 0-100% score of correct answers to a set of questions.

One example embodiment of the training model for an adaptive trainer, the HAL training model, comprises the following parameters and variables, including some details of the parameters, the parameter variables, the variables and their corresponding values, listed below.

Skills are represented as the list of Knowledges, Skills, and Abilities (KSA's) relevant to the training domain. Throughout this document, we will interchangeably refer to KSA's as skills. The parameter value for this parameter is any type of identifier to represent the KSA such as an alphanumeric value.

Training items represent a set of possible training scenarios/actions/lessons, which we will refer to as training items. Items have two goals: the first is to train the student on the skills that are addressed by the item and the second is to measure the student's proficiency on each skill. Each item is associated with two parameter variables comprising an item difficulty and an item applicability for each of the skills. The values for these two parameter variables are any type of identifier to represent the item such as an alphanumeric value. For example, in one embodiment of the item difficulty, let IPI be the number of competencies or principles which influence training, the item is described as a tuple in $R^{|P|}$, and the $i^{th}$ component of the item tuple belongs to a range of 1 ... $P_i^L$, where $P_i^L$ is the number of levels associated with the $i^{th}$ competency. An example of an item tuple is <1, 3, −1> representing a difficulty of 1 on the first competency, 3 on the second competency, and the third competency is not addressed in the item.

The transition function reflects the probability that the student will "transition" to a higher level of skill after taking the training item. For each item, for each KSA, and for each level that the KSA at, we define a transitional probability variable.

Skill levels represent the set of possible student levels for each skill. The variable values may be any type of alphanumeric value representing any level of granularity of skill level. In some embodiments, for simplicity, we assume parameter values such that KSA's have 3 levels, which we label "Novice", "Intermediate", and "Expert". For simplicity, in some embodiments, we map these parameter values to numbers, and have a default mapping such as: Novice=1; Intermediate=2; and Expert=3.

Training measures reflect a measurement of a student's performance at the item. The HAL model includes one or more training measures associated with each item. The value for this parameter variable is any type of identifier to represent the training measure such as an alphanumeric value. In some embodiments, measures may be in the form of a parameter value representing full credit or Partial Credit Model (PCM). That is, each item is associated with one or more measure values of 0, 1, 2, ... n, where n is full credit. For cases where the measures aren't in this format (see periscope example below), a pre-processing module may translate the raw measures into this format.

In some embodiments of the HAL training model, some of the parameter variables may be translated to integer values similar to the method described for skill levels above, and that integer value may serve as the parameter variable value.

FIG. 2E illustrates parameters 211E of one example embodiment of a training model having training model parameters (row 1 titles) with training model parameter values (populated values in rows 2-5). This training model's input data has some required fields, in this embodiment, Student ID and Item ID. The sequence number variable is filled in if the same student encounters multiple items. Sequence number can be either explicitly stated, or filled in by HAL. The next several columns reflect the fact that the training model can use several values for training model parameter values. For example, performance measurement values can be any Pass/Fail, an observation, or numerical.

Typically, performance measurement values are already in training data of they may be obtained as a student performs in a physical or virtual training event. FIG. 2E also shows columns reflecting training model parameter values for student skill levels associated with each training time. These skill level parameters represent training model parameter variables that may be inferred by the machine learning component, rather than being required to be present in training data.

The parameters of the training model may be related mathematically to use these parameters to indirectly determine a characteristic of a student and some of the parameters may be able to be determined through characteristics, such as performance, of the student. As more student characteristics, or performance data are available, probabilistic determination of the parameters and characteristics can be more accurate.

One method of relating the parameters of the training model is through the use of Item Response Theory (IRT). In using IRT, the training model is able to support training measures at the item, or item level. This will allow determination of parameters and their parameter variables down to a much more detailed level.

Figure 3:
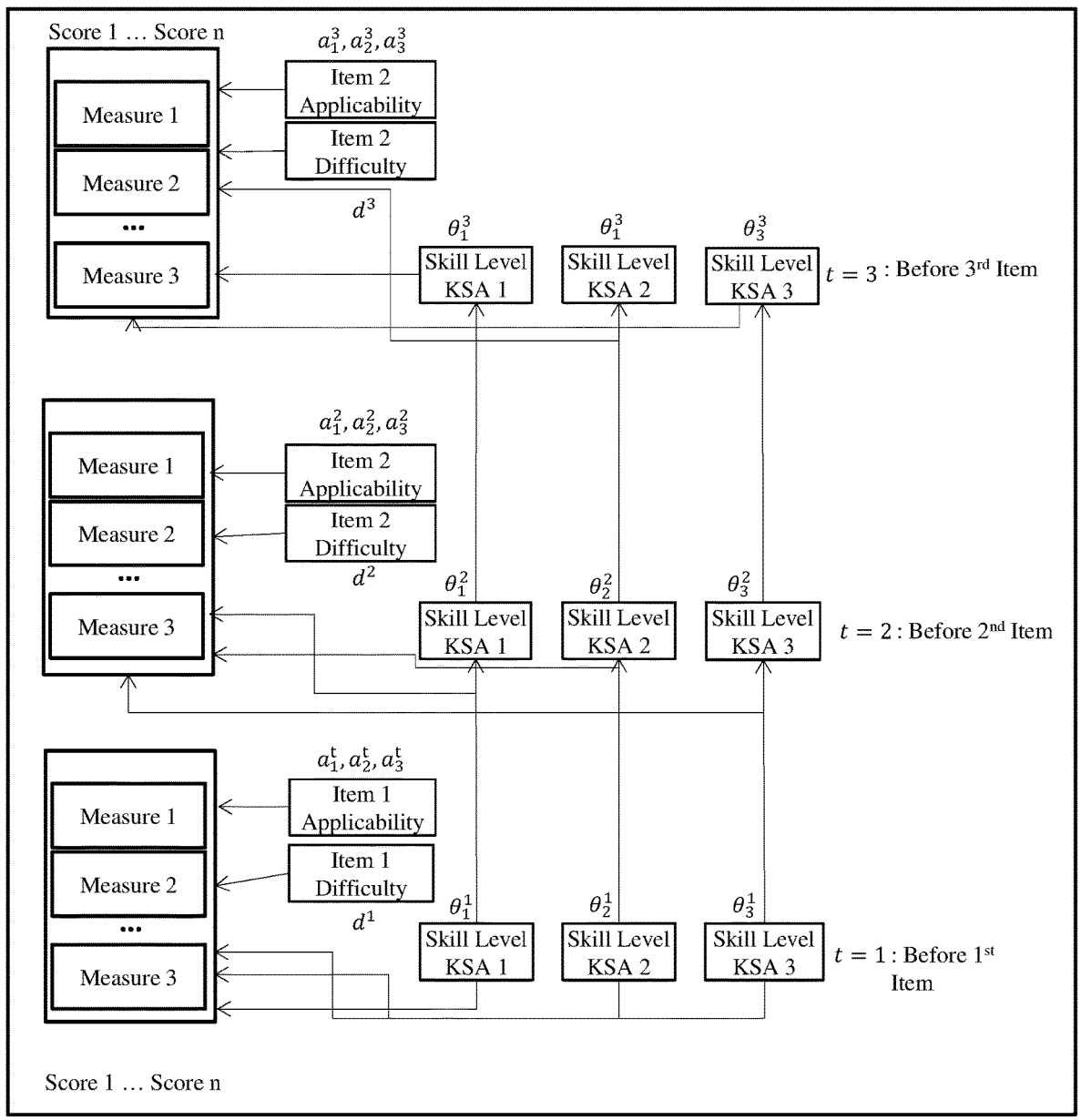
FIG. 3 shows an example embodiment of an automated learning model.

FIG. 3 shows an example embodiment of the HAL training model 340. For simplicity purposes, this example generally illustrates a portion of the training model and therefore does not show parameters such as the training objective. As shown, this HAL training model 340 includes measures, applicability of each item to each score ("a"), difficulty of each item ("d"), student skill levels ("θ" or theta), and transitional probabilities (arrows between θ between time steps). In the rightmost part of the figure, time is referred to as the variable t, and t=1, represents the moment in time before the student took the first training item, t=2 represents the moment in time after the student took the first item but after the second, etc. Moving leftwards, the variable representing student skill level on KSA k at time t is denoted $\theta_k^t$. Each $\theta_k^t$ is determined by $\theta_k^{t-1}$, as well as the probability distribution $Pr(\theta_k^t | \theta_k^{t-1}, s)$, where s represents the item id. (This probability distribution is not shown in the figure.) Moving further to the left, each training item has an item difficulty, the difficulty of training item i is denoted $d^i$. Each training item also has an item applicability to each KSA, the item applicability of training item i to KSA k is denoted $a_k^i$. We normalize this variable for each training item, so $\Sigma_k a_k^i = 1$.

Finally, on the left hand side of FIG. 3 we see training measures. In this embodiment, the training model uses any type of Item Response Theory model and in the embodiment described below, the training model uses Partial Credit Model (PCM) and a measure can represent correct, incorrect, or partially correct responses. Gradations of partial correctness are also acceptable, that, is, items can be scored on a scale of 0 to m. Not shown in FIG. 3 is the equation governing the PCM model itself. We use a PCM Item Response model:

$$P_{\{c\}} = \frac{e^{\sum_{j=0}^{c}(\theta - d_j)}}{\sum_{h=0}^{m} e^{\sum_{j=0}^{h}(\theta - d_j)}} \quad \text{Equation 1}$$

In this Equation 1, c represents the performance data (to an item), m represents the number of possible performance data types, j is an index, and $d_j$ represents the difficulty of achieving that performance data (item difficulty).

To understand this equation, first note, by inspection of the denominator's inner summation (it matches the form of the numerator), that the denominator is just a normalization term for the numerator. θ represents the student's skill level, and $d_j$ represents the difficulty of achieving response j. Thus note that if $\theta \gg d_j$, the numerator is very large and the response is very likely. Conversely, if $\theta \ll d_j$, the numerator is very small, representing a very difficult item for the student, and the response is very unlikely to be achieved. When the difficulties are ordered so that $d_j \leq d_{j+1}$, then each $d_{j+1}$ is less likely to be achieved than $d_j$, and the equation can be viewed as the probability of achieving gradations of correctness such as incorrect, partially correct, almost correct, and fully correct.

$$d_j \leq d_{j+1}$$

The notation of the difficulty variable can be augmented to include the item being trained. That is, denote with $d_j^i$ the jth difficulty of training item i. With the augmented notation, Equation 1 becomes:

$$P_{\{c\}} = \frac{e^{\sum_{j=0}^{c}(\theta - d_j^i)}}{\sum_{h=0}^{m} e^{\sum_{j=0}^{h}(\theta - d_j^i)}} \quad \text{Equation 1a}$$

In the HAL training model, we furthermore augment Equation 1a to include multiple skills and an item applicability for each skill.

$$P_{\{c\}} = \frac{e^{\sum_{j=0}^{c}(\sum_{k=1}^{n}(\theta_k a_k^i - d_j^i))}}{\sum_{h=0}^{m} e^{\sum_{j=0}^{h}(\sum_{k=1}^{n}(\theta_k a_k^i - d_j^i))}} \quad \text{Equation 1b}$$

As a technical note, in the HAL training model, student skill levels are vectors, $\theta_k^t$, one for each KSA k. This variable is denoted by $\theta_k^t$, which represents the student's skill level on skill k after the $t^{th}$ lesson. So for example $\theta_4^3$ represents the student's skill level on "Skill #4" after the $3^{rd}$ lesson. But for ease of explanation, Equation 1 assumes a single skill. To obtain a single scalar and fit Equation 1, we multiply student skill level by item applicability, that is assuming n different skills:

$$\theta = \sum_{k=1}^{n} \theta_k^t a_k^i \quad \text{Equation 2}$$

Equation 1 specifies a probability on the left side and a mathematical expression on the right side. The value of the expression equals the probability. However, for use in HAL, it is often more illustrative to portray Equation 1 in terms of sampling. Rather than expressing that the left side is a probability over the distribution over response types denoted by c, Equation 4 below represents that a value is sampled from that distribution. The equation operator, "=", is replaced with the sampling operator, "~".

$$\text{response} \sim \frac{e^{\sum_{j=0}^{c}(\theta-d_j)}}{\sum_{h=0}^{m} e^{\sum_{j=0}^{h}(\theta-d_j)}} \quad \text{Equation 4}$$

Equation 4 says that the response type is sampled by the probability distribution defined in the right side.

The example of FIG. 3 shows some of the parameter variables of the training model. The values for these parameter variables are generally provided by the training data as input to the training model. When the training data may not include all the values, or the training data may not include accurate values, estimates are made of the parameter variable values for an initial run of the model and these values are refined, or learned, as the training model is iterated with additional training data.

With the training measure value from the student's performance on the training item, typical parameter variable values that may be learned in this training model include (1) the training item difficulty value, (2) the training item applicability value, (3) the transitional probability in the transition function that the student will "transition" to a higher level of skill after taking the training item and (4) the observational probability in the observation function of receiving an observation after "transitioning" to a higher skill level. These values are learned generally by taking the users training measure values over multiple times, solving for parameter variable values based on the mathematical relationships between the parameters and statistically updating the parameter variable values to learned values based on the multiple values calculated over the multiple times. For example, using Equation 1b, we can learn the item difficulties and item applicabilities, thus we fill in all the variables on the right side of the equation so we can calculate a learned observational probability values and a learned observation function.

Training Data:

As one example of training data for use as input into the HAL training model, DRI data 216B had the structure shown in FIG. 2B. The DRI data 216B represented the response of military personnel to a series of questions about how they'd handle given situations. The DRI data consists of pre and post-test data for various students given one of two sets of items/scenarios, called "Red" and "Blue". This data in FIG. 2B only represents a small subset of items and therefore some of the item data is not listed. The DRI data comprises a pre-test, a post-test, for two possible sets of items, for ~100 students. The Red set of items had 139 items and the Blue set of items had 155 items. Because there were two sets of items but a large number of measures/items, we slightly abused the notation above and assume each in-item t uestion is its own item with its own item difficulty $d^i$ (e.g., for Item 1A1 in FIG. 2B, $d^{1A1}$) and its own item applicability vector a, rather than just having one global difficulty and one applicability for the whole set of items. There were 8 KSA's (called KPA's in the DRI data) specified, so we set the number of KPA's, k=8. Each item then had an item applicability attached to it, so for instance, suppose let's look at Item 1A1 above. We thus have item applicability variables:

$$a_{KPA=1}^{1A1}, a_{KPA=2}^{1A1}, a_{KPA=3}^{1A1}, a_{KPA=4}^{1A1}, a_{KPA=5}^{1A1}, a_{KPA=6}^{1A1}, a_{KPA=7}^{1A1}, a_{KPA=8}^{1A1}.$$

Similarly, each student has a skill level for each KPA. Since the table shows this student identification number is 242, we have variables for student 242:

$$\theta_{KPA=1}^{t}, \theta_{KPA=2}^{t}, \theta_{KPA=3}^{t}, \theta_{KPA=4}^{t}, \theta_{KPA=5}^{t}, \theta_{KPA=6}^{t}, \theta_{KPA=7}^{t}, \theta_{KPA=7}^{t}$$

Since there are only two points in time, pre-test and post-test, in the above variables t=0 for pre-test and t=1 for post-test.

Turning to the training measures, "Possible score" can be as high as 3, so the Partial Credit Model can have responses of 0, 1, 2, or 3. There is a separate measure for each item, or 139 measures in Red and 155 in Blue.

Thus, for each item, and for each student, we can use the model to find the probability of the student score on that item (transitional probablity). The probability of achieving that outcome is governed by Equation 1 and Equation 3.

Finally, as an added feature to the model, we have the transitional probabilities of the transition function (trans). These are:

$$Pr(\theta_{KPA=1}^{t+1}|\theta_{KPA=1}^{t}, Red), Pr(\theta_{KPA=2}^{t+1}|\theta_{KPA=2}^{t}, Red), \ldots Pr(\theta_{KPA=8}^{t+1}|\theta_{KPA=8}^{t}, Red),$$

and $$Pr(\theta_{KPA=1}^{t+1}|\theta_{KPA=1}^{t}, Blue), Pr(\theta_{KPA=2}^{t+1}|\theta_{KPA=2}^{t}, Blue), \ldots Pr(\theta_{KPA=8}^{t+1}|\theta_{KPA=8}^{t}, Blue),$$

Note: as a minor notational issue, there is actually one of these probabilities for each skill level (num_skill), so in a software embodiment we specify variables such as:

$$Pr(\theta_{KPA=1}^{t+1} = \text{expert} | \theta_{KPA=1}^{t} = \text{novice}, \text{scenario} = \text{Blue})$$

As another example of training data for use in the HAL training model, Periscope training data 216C had the structure as shown in 2C. In reality, there were 91 rows for each student, but we use the example data below for simplicity.

Because all rows have the same student, each row is associated with a time step. Since the data above is in rows 2-4, we can assign:

$$t = row - 1$$

So, for example, in the data in row 2, we assign t=1. (The above data is a sanitized example, in the real data, there are 91 rows per student.)

Scores (training measures) are determined by computing the difference between Called AOB and Actual AOB (columns D and E of FIG. 2C), so the errors in the depicted data are the errors depicted in the Error column in FIG. 2D. Assuming that an error less than 15 yields full credit, and an error less than 30 yields part credit, the scores (training measures) are as depicted in the table shown in FIG. 2D. Data for errors, credit and scores are shown in data 228D of FIG. 2D.

Referring to FIG. 2C, each item in the Item Name column, has a item difficulty attached to it, we capture that in a variable for each item, that is we have variables:

$$d^{4897}, d^{2342}, d^{9187}$$

The superscripts were obtained by the Item Name column. More typically, in the HAL training model software we may arbitrarily assign each variable an id, so these same variables are more simply identified as:

$$d^1, d^2, d^3$$

With the understanding that the variable $d^2$, for example, represents the difficulty of the item named "2342".

In some embodiments, we assumed a 3 or a 5 skill level model. Assuming a 3-skill level model, then we have variables whose superscripts correspond to Column C of the data:

$$a_{KPA=1}^{4897}, a_{KPA=2}^{4897}, a_{KPA=3}^{4897}$$

$$a_{KPA=1}^{2342}, a_{KPA=2}^{2342}, a_{KPA=3}^{2342}$$

$$a_{KPA=1}^{9187}, a_{KPA=2}^{9187}, a_{KPA=3}^{9187},$$

Likewise, the superscripts are renumbered so we have:

$$a_{KPA=1}^{1}, a_{KPA=1}^{2}, \text{etc.}$$

Similarly, we have variables representing student skill level at the time the student took each item:

$$\theta_{KPA=1}^{t=3}, \theta_{KPA=2}^{t=3}, \theta_{KPA=3}^{t=3}$$

$$\theta_{KPA=1}^{t=2}, \theta_{KPA=2}^{t=2}, \theta_{KPA=3}^{t=2}$$

$$\theta_{KPA=1}^{t=1}, \theta_{KPA=2}^{t=2}, \theta_{KPA=3}^{t=3},$$

We also have the transition function component of the model, that is, the transitional probability that student competence will change as a result of the training item. These variables are:

$$Pr(\theta_{KPA=1}^{t+1}|\theta_{KPA=1}^{t}, 4897), Pr(\theta_{KPA=1}^{t+1}|\theta_{KPA=1}^{t}, 2342), Pr(\theta_{KPA=1}^{t+1}|\theta_{KPA=1}^{t}, 9187),$$

Note: as a minor notational issue, there is actually one of these probabilities for each level, so in the software it would be more accurate to specify the full variable to be of the form:

$$Pr(\theta_{KPA=1}^{t+1}=\text{intermediate}|\theta_{KPA=1}^{t}=\text{novice,scenario}=4897)$$

with one of these variables for each of the possible student levels.

We are now ready to compute the probability of a student getting a score correctly. For simplicity of the following computation, let us assume we know these variables:

$$\theta_{KPA=1}^{t=2}, \theta_{KPA=2}^{t=2}, \theta_{KPA=3}^{t=2},$$

And that we would like to know the probability of this student scoring correctly/incorrectly/partially correct on the item named "2342".

The assumption that we know student state will allow us to ignore transitional probabilities in the following computation, since the role of the transitional probabilities in our model is to help us compute the student state values. Making this assumption, we can now find an overall student capability:

$$\theta = \sum_{K=1}^{3} a_k^2 \theta_K^2$$

To find the probability of an incorrect response (category=0), we can plug into Equation 1:

$$P_{\{0\}(\theta)} = \frac{e^{\sum_{j=0}^{0}(\theta-d_j^2)}}{\sum_{h=0}^{m=2} e^{\sum_{j=0}^{h}(\theta-d_j)}}$$

Similarly, the probability of a fully correct response is:

$$P_{\{2\}(\theta)} = \frac{e^{\sum_{j=0}^{2}(\theta-d_j^2)}}{\sum_{h=0}^{m=2} e^{\sum_{j=0}^{h}(\theta-d_j)}}$$

Given the HAL training model above, below is a procedure for learning the parameter values of the variables from data with machine learning. For simplicity, we show initialization and sampling of just the basic variables of a (item applicability), d (item difficulty), theta ($\theta$, skill level), and trans (transitional probability). For the initialization, the training model is provided N (predefined value of number of KS As), $d_{\{max\}}$ (predefined difficult parameter value) and Scores (performance data). The machine learning is used for each i (item). We have also experimented with sampling other variables as well, such as (for the periscope data) probability of an item training a given skill, given meta-data on the item such as Time of Day for the periscope domain.

Generally, the training model follows IRT models which statistically relates values of variables. This statistical relationship can be used to simultaneously estimate student skill levels, item difficulty levels, how applicable each item is to each skill, and "transitional probabilities", which is the probability that each item will advance each KSA of the student. And as more data is gathered, such as through capturing performance data, the statistical relationship can be strengthened. And, as data changes, the statistical relationship can also be changed. For example, if the student skill level is assigned for each time step within the data, then a transition function can be determined by counting how many times the student transitions from one level of skill to another when a training item is given to the student (a Dirichlet distribution can be used to refine this counting process). As another example, say we have a student, with some unknown ability, who takes a test with questions (action/item). With information regarding the difficult of each question, it is expected that the student will get easy questions correct and difficult questions wrong. If you plot each answer from the student, where the x coordinate is the question difficulty and the y coordinate is 1 (correct) or 0 (incorrect). Fitting a logistic curve to this data, we'll find a point on the curve where, as a function of question difficulty, the student goes from usually getting questions right to usually getting questions wrong. The location of this point is an estimate of student's skill level. For students with a higher skill level, this point will be far toward the "difficult" end of the spectrum, indicating that a high-skill level student mostly gets questions right, even the hard ones. Likewise, for low-skill level students; they will miss a lot of questions, even easier ones.

The initialization methods 916 shown in FIG. 9 illustrate one method of determining an initial set of parameter values without knowing actual parameter values.

The sampling code below shows how parameter values are learned. Generally, these values may be learned using Markov Chain Monte Carlo (MCMC) and Gibbs sampling. These algorithms are used for learning multiple unknown variables. In this case, unknown variables are all $d^i$ variables (item difficulties), all $a_k^i$ variables (item applicabilities), all $\theta_k^t$ variables (student skill levels at all times for all skills), and all transitional probabilities $Pr(\theta_k^{t+1}|f_k^{t+1},i)$. The only known variables are the response type (correct/incorrect) by the student on each item at each time. Gibbs sampling assigns temporary values to all of the unknown variables, except for one unknown variable, which is withheld. The unknown variable is then sampled from the distribution shown in Equation 4 (Equation 4 will need to be re-oriented so that the withheld unknown variable in question is on the left and the known variables are on the right). The withheld variable is then assigned the sample value, and a new variable withheld.

As shown in FIG. 10, methods such as MCMC and Gibbs sampling can be used to learn an average value assignment for each variable, for each item, across many samples.

As shown in FIG. 10, sampling methods 1016 such as MCMC and Gibbs sampling can be used to learn an average value assignment for each variable, for each item, across many samples.

Sample_difficulty re-orients Equation 1b (using the sampling operator "~" instead of the equality operator "=", as discussed in Equation 4) so that the difficulty variable $d_j$ is on the left, and all other variables and values are on the right. It finds the probability distribution for $d_j$, and then samples from this probability distribution.

Sample_a re-orients Equation 1b (using the sampling operator "~" instead of the equality operator "=", as discussed in Equation 4) so that the difficulty variable $a_k^i$ is on the left, and all other variables and values are on the right. It finds the probability distribution for $a_k^i$, and then samples from this probability distribution.

Sample_theta re-orients Equation 1b (using the sampling operator "~" instead of the equality operator "=", as discussed in Equation 4) so that the difficulty variable $\theta_k^t$ is on the left, and all other variables and values are on the right. It finds the probability distribution for $\theta_k^t$, and then samples from this probability distribution.

The sample_trans is a slightly different procedure, in that transitional probabilities can be determined by counting the number of times the student transitions from one state to another. However, the procedure could fail or the overall algorithm can converge to extreme solutions if there are no samples of a given type. Therefore, we use a Dirichlet hyper-prior which acts as a pre-count. In our experiments, we assumed that one transition from each state, and to each state, was always counted, and we added that prior to the rest of the count. One example embodiment of sample_trans comprises the calculation below:

$$Pr(\theta^{t+1}|\theta^t, i) \sim Dir(\theta^t) \forall \theta^t$$

where item i was applied to the student and where Dir represents a Dirichlet distribution, and $\theta^t$ is defined as student state as in Equation 1 (adding a superscript t to denote the timestep, and $\theta^t$ representing estimates across all students).

With the training model and its variables defined, MCMC and Gibbs sampling are statistical methods that may be used to iterate over the variables one at a time to find the best parameter assignment for that variable.

Figure 7:
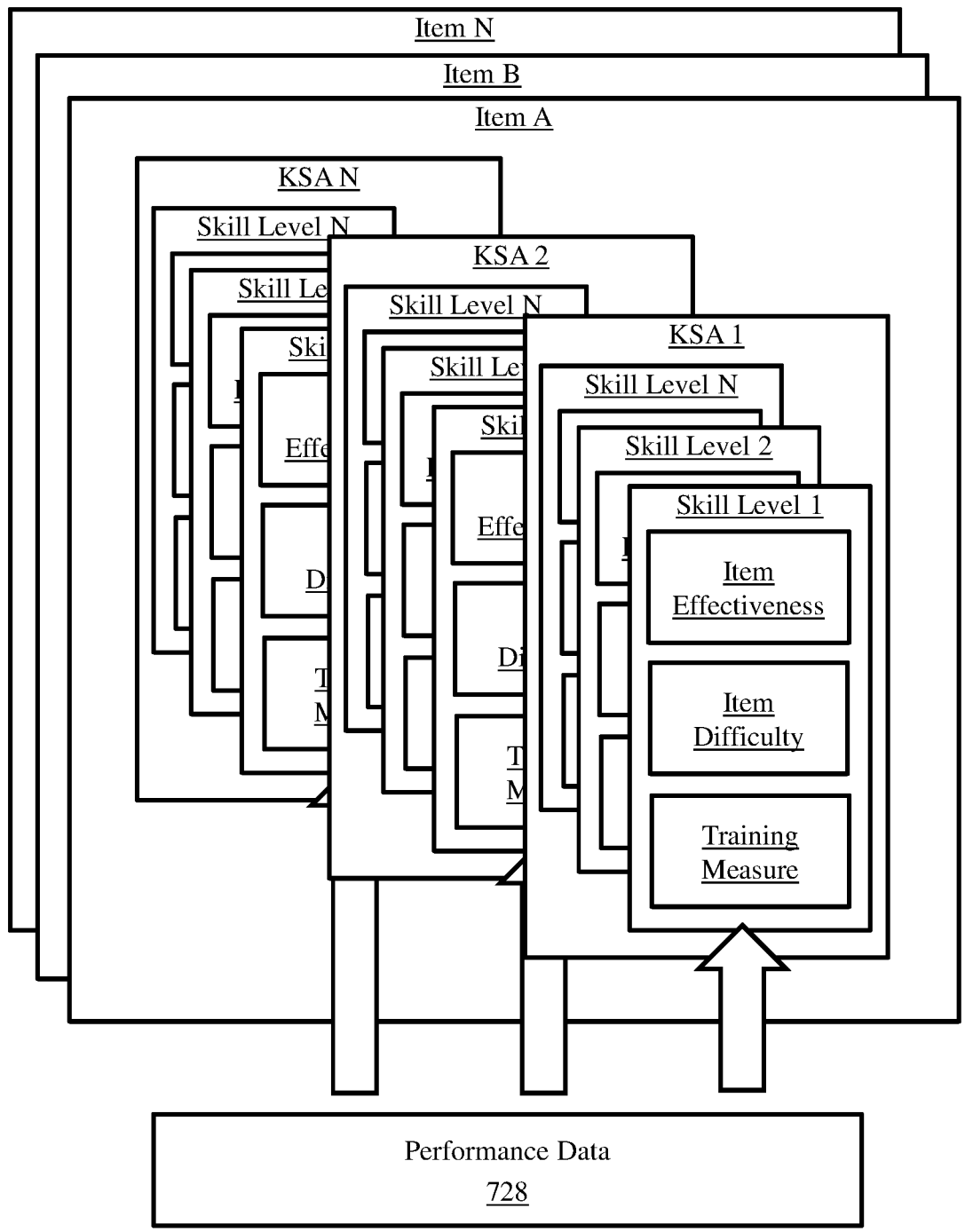
FIG. 7 is a functional diagram illustrating the relationship of some of the variables and the parameter variables as used by an example embodiment of the machine learning functions.

The functional diagram FIG. 7 illustrates the relationship of some of the variables and the parameter variables as used by the machine learning functions. As shown, each item (i; shown as Item A, Item B . . . Item N) has one or more predefined skills (KSA 1, KSA 2 . . . KSA N) each having one or more skill levels (skill_num; shown as Skill Level 1, Skill Level 2 . . . Skill Level N) and each skill level being related to a transition function (not shown) comprising an item applicability (a; shown as Item Effectiveness) an item difficulty (d; shown as Item Difficulty). For each skill level there is also an observation function (not shown) defining the relationship between the training measure (o; shown as Training Measure) and the skill level. As described above, after a training measure (o; shown as Training Measure) is received from a student's performance on a training item, that training measure may be input into the IRT algorithms to determine the student skill level as well as the values for the other parameter variables based on the parameter's mathematical relationships. As described above, new performance data 728 representing a training measure may be used to learn the transitional probability of that item to that skill level and that skill. Over time and a larger sample size for the training measure, for example as students and performance changes, the training measure may change. Using the IRT algorithms, if this input data changes, the other variable changes will also be able to change. And through probabilistic methods, such as averaging the values of variable, these changes can be used to update, or automatically learn, those updated variable values as a result of the performance data changes. This automated learning may reflect a more refined definition of the value for the training parameters or it may reflect the changing of the performance for other reasons.

Artificial Intelligence (AI) System:

Referring back to FIGS. 1 and 2A, the data and ML output can be used to provide input into the AI functionality. Generally, the AI system takes the training model from the ML output as an input and generates the Instructional Policy as an output. In some embodiments, the AI functionality is provided by a POMDP which can be translated to an Instructional Policy to issue training recommendations. With this approach, we leverage the theory of deliberate practice which posits that expertise grows best when the student focuses study and practice on specific, deficient competencies, and receives feedback concerning the effects of this experience. The automated learning systems represent this theory formally as a generalizable, adaptive path planning POMDP model. The automated learning methods construct the representation in two steps: First with a POMDP model, then with an augmented model that uses incoming data to fine-tune its parameters for After Action Reporting (AAR).

The initial POMDP model may be a Bayesian framework, with the following implementation inputs (some from ML outputs) prior to training:

TABLE 1

| | POMDP inputs | |
| --- | --- | --- |
| AI Input 1 | KSAs: The predefined set of Knowledges, Skills, and Abilities (KSA's) being trained. | |
| AI Input 2 | Skill Level: The student's current skill level from the list of predefined skill levels. | From ML Training Model ($\theta$ values) |
| AI Input 3 | Items: The predefined set of training items available. | |
| AI Input 4 | Item Effectiveness: The transitional probability that each training item advances each KSA, given the student's current skill levels. | From ML Training Model (transitional probabilities) |
| AI Input 5 | Training Measure: The measure of the student's performance on the training item. | |
| AI Input 6 | Observational Probability: A set of probabilities corresponding to measurement error; the chance that a student is at a given competency level given the measurements taken during training. | From ML Training Model (observational probabilities) |
| AI Input 7 | Priority: Optionally, a prioritization of training objectives. | |

The POMDP learning model probabilistically represents the relationship between measures (observations) and student competency, as well as the effects of feedback on competency. Generally, this can be used to perform Bayesian inference, thus it will assess where the student lies on the training path. Outputs are as detailed below.

AI Output 1: An assessment of student progress, including assessed student skill level on skills in the training domain.

AI Output 2: A prediction of the effect of displaying each type of feedback to the student.

AI Output 3: An optimal training plan (Instructional Policy) to achieve expertise, beginning with a suggestion to the instructor for the training item that will most likely move the student towards mastery of the skills.

These outputs from the learning model may also be used to select the items, consistent with the Instruction Policy, so that the data regarding the item and the student's performance can be used to update the training model and again feed the learning model to provide further items to guide student learning.

AI Input 1: KSAs (AI—Competencies).

KSAs, also known as competencies, are domain-specific areas of competence. Different applications of this work have required slightly different terminologies, sometimes we alternatively refer to these as principles or competencies. In the HAL framework, each principle becomes a training objective, thus a typical intelligent tutoring application instructs the student in several competencies corresponding to several training objectives. For a marksmanship domain, KSAs could be the ability to perform well while standing, sitting, kneeling or prone. Or they could be more fundamental, such as the ability to pull a trigger. For some embodiments, the methods discover the competencies in the ML component that informs this AI component.

AI Input 2: Skill Levels.

Skill levels of the learning model provide similar functions as do the skill levels of the training model.

AI Input 3: Items (AI—Actions) and Item (Action) Difficulties.

We seek to model decision-making on the part of an instructor. A decision is what item, or action, to take. The word "Action" has a specific meaning in a POMDP model, the set of actions/items is the set of action/item options available. For a robot using a POMDP model, this set of options is whether to go forward, back, turn left, or turn right; for an automated instructor using a POMDP model, the options are any set of item options made available to the trainer. Options include what type of instruction to dispense, we shorten this by calling this selection of a "Item" which is written, video, or other instructional material used for training. Each item is associated with a level of difficulty on each KSA.

For example, let IPI be the number of competencies or skills which influence training. A item may be described as a tuple in RIPI. The ith component of the item tuple be-longs to a range of 1 . . . PiL, where PiL is the number of levels associated with the ith competency. An example of a item tuple is <1, 3, −1> representing a difficulty of 1 on the first competency, 3 on the second competency, and the third competency is not addressed in the item.

Items have two effects. The first is to train the student on the principles that are addressed by the item. The second is to measure the student's proficiency on each skill.

AI Input 4: Item Effectiveness and Zone of Proximal Development (ZPD).

The transitional probabilities of the learning model are similar to the item effectiveness of the training model.

In some embodiments, the process recognizes that in any given state of expertise, the student can be expected to solve a subset of the available items if given some help. This subset is called the student's Zone of Proximal Development (ZPD). Items in the ZPD are neither trivially easy nor impossible to solve, but are conquerable with some support from the tutoring system. When a item involves multiple principles, then it should be optimally effective if some or all of its principles are within the student's ZPD and the rest have already been mastered by the student. None of the principles should be beyond the student's ZPD.

Figure 4:
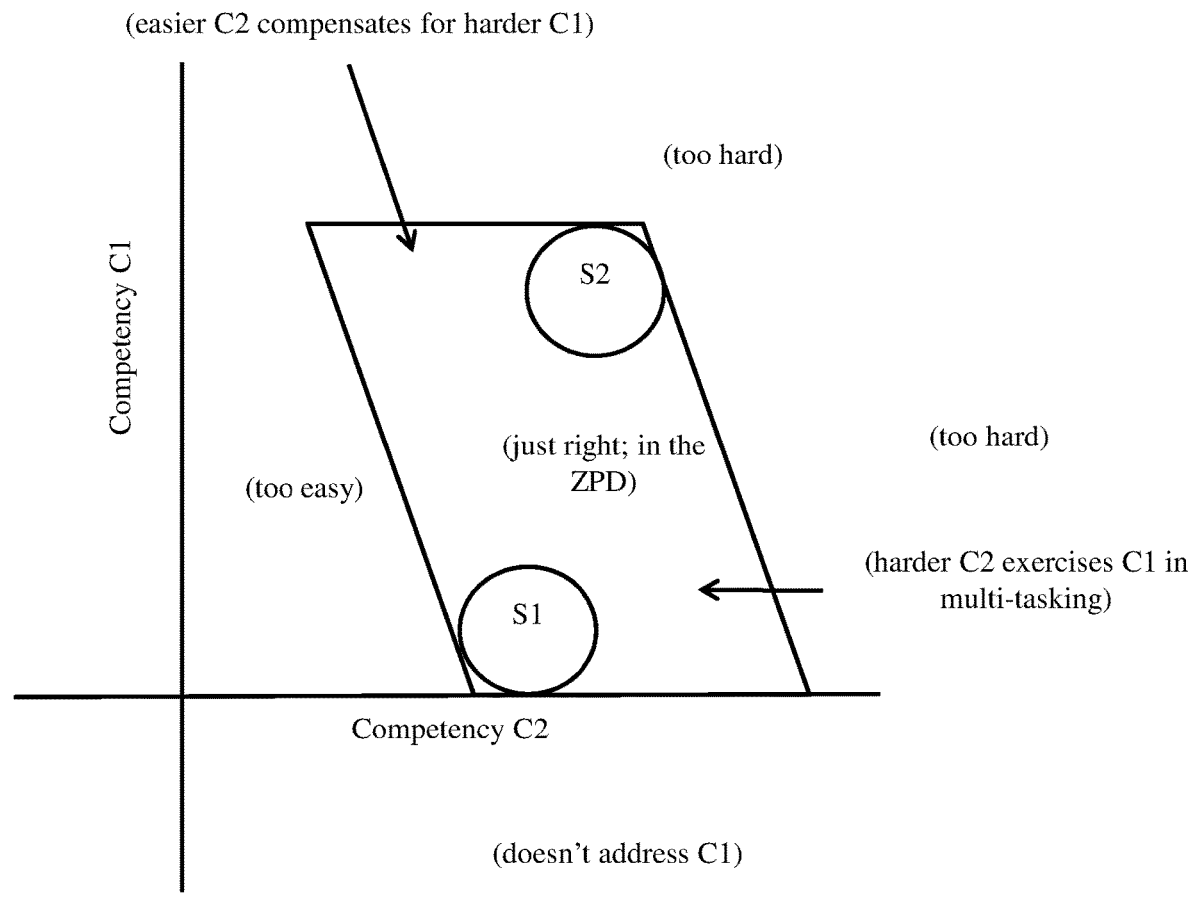
FIG. 4 provides an example illustration of the training items that are most likely to enhance adaptive expertise of the given student mastery of an item (S1) are those that lie within the Zone of Proximal Development (ZPD) of the student.

The ZPD is defined by specifying the minimum and maximum threshold of every principle in order to support training. Thus, each principle and level has a ZPD attached to it, which defines a point in R 2|P|, in turn representing a region in R|P|. An example of a ZPD can be seen in FIG. 4. Regions within the ZPD support learning of the principle. Regions to the left of the zone are too easy with respect to Competency C2, while regions to the right are too difficult. The training items that are most likely to enhance adaptive expertise of the given student mastery of a training item (S1) are those that lie within the ZPD of the student. They are neither too easy, too hard, nor near-duplicates of S1.

AI Input 5: Training Measures.

Training items also result in a set of measurements. Each item and competency results in a measurement that estimates the student state (level) on the principles (skills) exercised by the item. For example, IRT says that if a student competency level is equal to the difficulty of the training item, the student has a 50% chance of answering correctly. If the student expertise exceeds the difficulty of the item by a couple of levels, that chance increases to 90+%. IRT is not the only measurement model, for pure vocabulary recall tasks the accuracy of the measurement may be very high, for multiple choice identification tasks the probability that a single item correctly measures acquisition of the word may be somewhat lower.

AI Input 5: Observational Probability.

The observational probability is defined as the probability that the student's performance produces a measure value, given that the student's true skill level. Using the laws of probability, this can be reverse engineered to determine the probability of a student level, given the student measures. An example of an observational probability is the probability that a student who is a novice at Skill A will pass a training exercise.

The observational probability is shown in Equation 1, 1a, and 1b, and Equation 4. It's the probability of observing correctness on an item (left side) given the student skill level, item difficulty level, item applicabilities (on the right side).

In a POMDP, the observational probability is the probability of an observation given the state and action. The state is the student skill level, and the action is represented by the profile of the training item (item difficulty level and item applicability).

AI Input 6: Prioritization of Training Goals.

This optional input assigns a reward or value to acquisition of each competency at each level.

With the above input, the learning model can perform the AI functions. In some embodiments, the learning model is a POMDP generally defined with the tuple:

$$M = <S, A, Pr, R, \Omega, O, \gamma, b_0>$$

with the variables being defined below.

S is a set of states.

A is the set of actions/items available to the adaptive training system.

Pr is the state transitional probabilities: Pr (s'|s, a∈A), the probability of transitioning to state s' given the previous state was s and action/item a was taken.

R is the reward function: R(s, a) is the immediate reward for being in state s and taking action/item a.

Ω is the set of observations.

O is the observational probability function: O(o|s',a,s'), with o ∈Ω is the probability of receiving observation o after being in state s and taking action/item a and transitioning to state s'. This observation function is learned via Equation 1b. We learn the item difficulties and item applicabilities, thus we fill in all the variables on the right side of Equation 1b so we have this probability function.

γ is a discount factor between 0 and 1.

$b_0$ is an initial distribution over states.

In one embodiment, data and ML component outputs can be translated into the POMDP model as described below.

States (ML—Skill Level for KSA): The set of state S is the set containing all possible student skill levels for the KSA's. That is, each s ∈S can be expressed as <$\theta_1$, $\theta_2$ . . . > where $\theta_k$ is the student's level at KSA #k.

Actions (ML—Item): There is an action/item for each available training item. We order the set and identify the $j^{th}$ action in the set with a difficulty $d_j$, to be used in the observation function.

State transitional probabilities (ML—Item Effectiveness): Pr(s'|s, a)=Pr($\theta_{s'}$|$\theta_s$, a) where $\theta_s$ and $\theta_{s'}$ are correspond to student state vectors described above.

Reward: For any state <$\theta_1$, $\theta_2$ . . . >, described above, we assign reward:

$$R=\theta_1+\theta_2+ \ldots \theta_n$$

Other rewards schemes are possible, such as:

$$R=\max_k \theta_1,\theta_2,\theta_n$$

Observation set Ω (Training Measure): In some embodiments, the methods support training measures from 1 to m where 1 represents incorrect, 2 represents partially correct and m represents correct.

Observation Function O (Observational Probability): First, in some embodiments, we simplify the observation function so that Pr(o|s, a, s')=Pr(o|a, s'), that is, we do not care about the "old" state before the training. Second, we use Equation 1b, where $d_j$ is determined by the action/item as mentioned above, and θ corresponds to s'.

γ: Is set to 0.99.

$b_0$: Is computed by the machine learning algorithms, it is assigned as $\theta^{t=0}$ from the result of the machine learning algorithms.

Figure 1B:
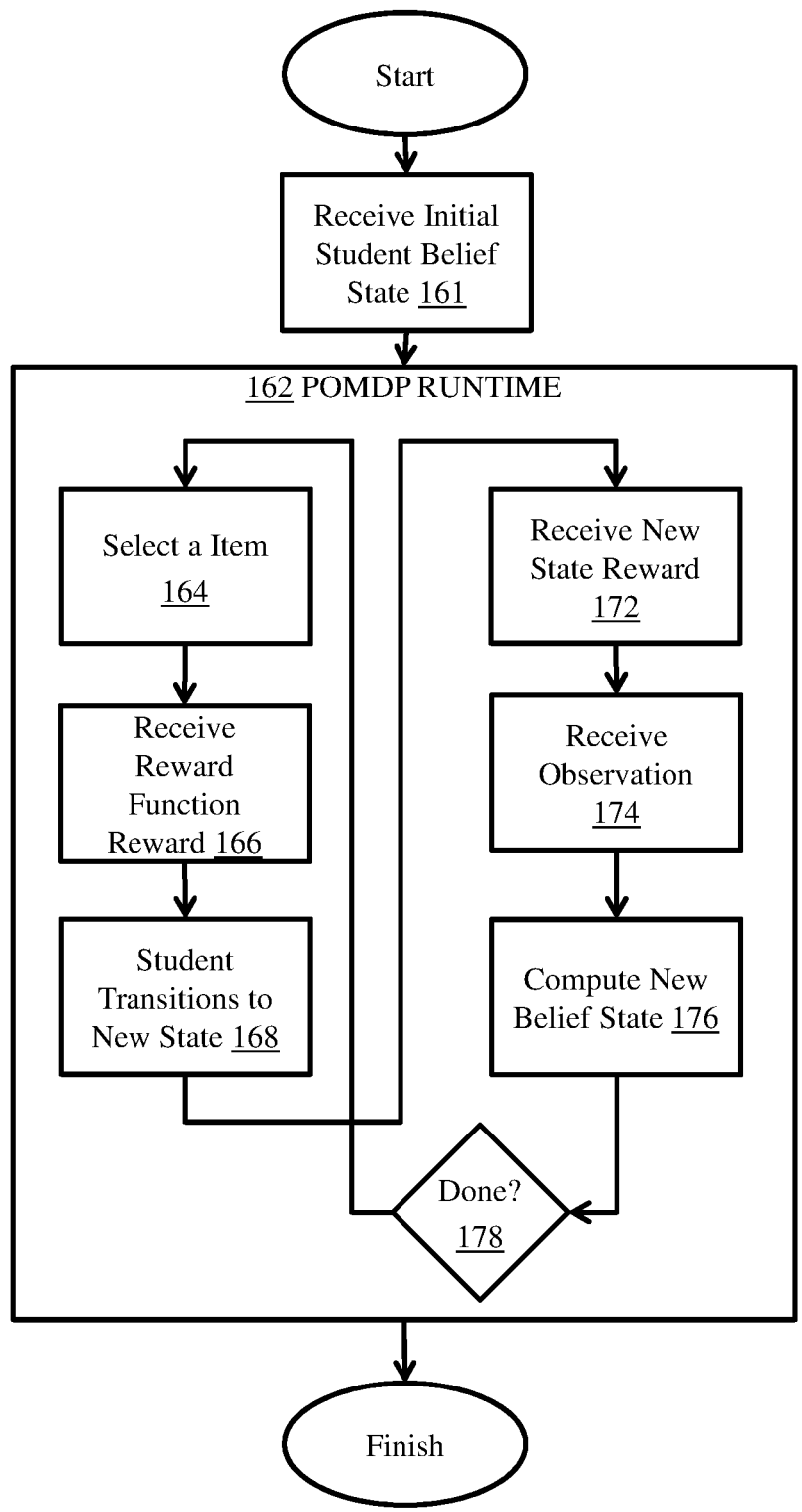
FIG. 1B illustrates one embodiment of a runtime of an example POMDP model.

FIG. 1B illustrates a runtime of the above POMDP model. At 161, the system receives and initially believes the student is in the state distribution defined by $b_0$ at 161. This belief may be determined randomly, made by making some assumptions based on the skill level of the user or it may be provided as an output of the training model. The system then selects a training item (action, scenario, learning activity) at 164. This selection may be made randomly, made by making some assumptions based on the skill level of the user or it may be made by the use of the instructional policy. The student receives a reward according to the reward function at 166. The student transitions to a new state (skill level value), unknown to the system but modeled by the transition function at 168. The system receives a reward for the student being in the new state (although it does not observe or know its reward) at 172. The system receives an observation of student performance on the item at 174. At 176, the system computes a new belief state (probability distribution over student states (skill level)) about the student derived from the previous belief state (previous skill level), the transition function, and the observation function. This new belief state, or updated user state is derived by a probability distribution (observation function) such as a probability table. The observation function, defines the probabilistic relationship between achieving a training measure and a student state (skill level value) for a training item. For example, a student in an advanced state on a training item is likely to achieve a high score on a corresponding training item. At 178, a determination is made whether the process is done. If it is not complete, the process repeats starting at 164.

The above sequence can continue indefinitely, but at each successive step the reward is multiplied by γ, forcing the sequence to converge.

Important to this sequence is the selection of the action/item at 164. We refer to the mapping from belief state (skill level) to a system action/item as the system Instructional Policy.

Figure 6:
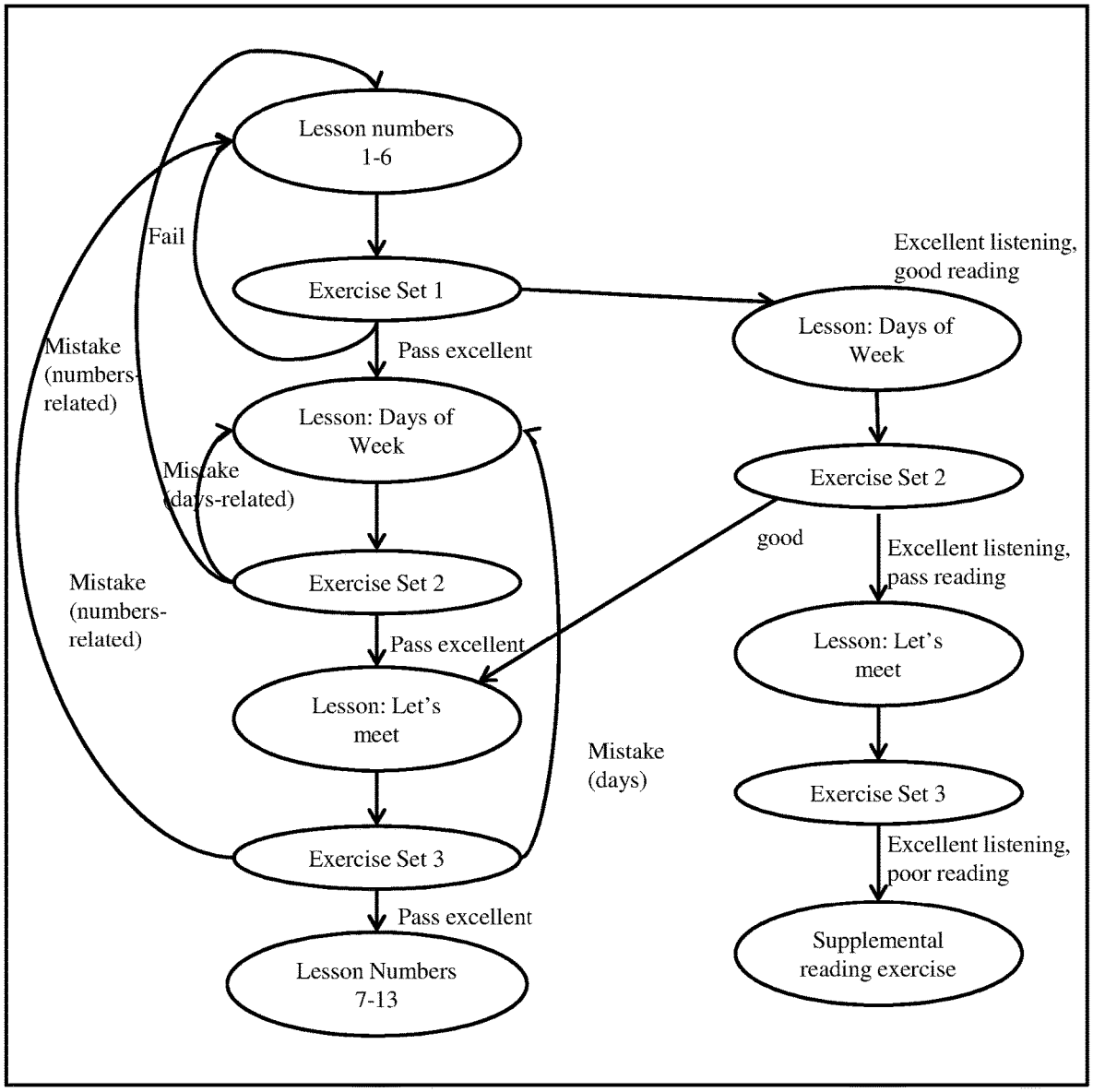
FIG. 6 illustrates one example embodiment of a POMDP instructional policy in action.

FIG. 6 illustrates an example of a POMDP instructional policy in action on a Language Learning domain at 612C. As shown, this illustration shows the application of the instruction policy using multiple exercise sets (Exercise Set 1, Exercise Set 2 and Exercise Set 3) and multiple lessons (Lesson numbers 1-6 and Lesson Numbers 7-13). As discussed above, at each time step, the system selects an action/item (shown as "Next content"), and then performance is observed (shown as "Performance"). Not shown in FIG. 6 is state itself. State can be thought of as a "report card" on the state of each student KSA. For example, a state can be <(Counting 1-6=mastered, Days of Week=Novice, Months of Year=Intermediate, . . . >. That is, state consists of a number of factors. Each state has a reward attached to it. However, state is not fully known, all that is known is observations or evidence. At runtime, this is used to construct a "belief state" (skill level) or a distribution over states ((KSAs) for example a student who passes a small quiz may be 50% likely to be proficient at counting and 50% likely to be intermediate). The belief state (skill level) is updated in real-time as observations are gathered. The goal of POMDP planning is to map each belief state (skill level) to the optimal action/item for that belief state (skill level). This computation is trivial for the "myopic" or 1-step horizon case: iterate over available/feasible items, and select the item that moves to a new state (skill level) with the highest reward. However, an advantage to the POMDP model is that it plans ahead many steps. The resulting plan is called a policy and examples of policies are illustrated below. Although planning far ahead into the future optimally is NP-complete, it has been shown that finding a policy that is within epsilon of being correct, for small epsilon, is linear with respect to number of actions/items and observations.

In some embodiments, components of the automated learning system may further comprise systems and methods of automatically measuring the performance of students to provide training data. Examples of some systems and methods of measuring the performance of students to provide training data include those described in co-pending U.S. Pat. App. No. 62/146,446 to Aptima, Inc., entitled "SYSTEMS AND METHODS TO MEASURE PERFORMANCE" filed on Apr. 13, 2015 which is herein incorporated by reference in its entirety.

Figure 8:
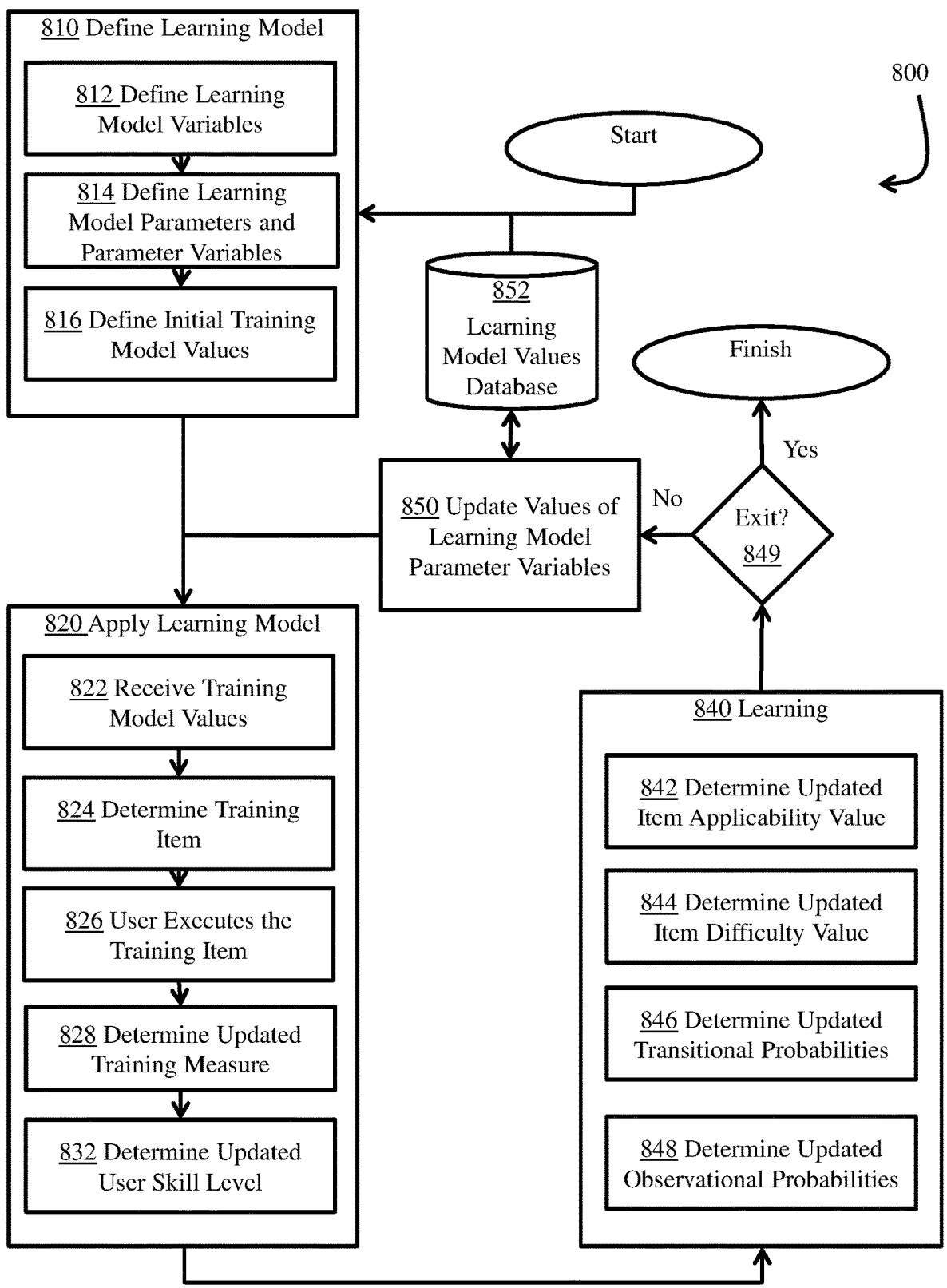
FIG. 8 illustrates a process diagram of an example embodiment of methods for automated learning of a training model of an adaptive trainer.

FIG. 8 illustrates the general method automated learning of a training model of an adaptive trainer 800. As shown, the methods generally comprise defining the learning model at 810, applying the learning model at 820, using the learning model and output from the model to learn values within the training model at 840 and updating the values of the training model at 850 to be stored at 852 or used by subsequent applications of the learning model at 820. Within the defining of the learning model at 810, the learning model variables are defined at 812, the learning model parameters and their parameter variables are defined at 814 and initial training model values are defined at 816. From this model, the values are used when the learning model is applied to a user. The application of the learning model at 820 generally comprises receiving the training model values at 822 to determine a training item to be presented to a user at 824. At 826 the user executes the training item and an updated training measure is determined at 828. With the updated training measure, an updated user skill level can be determined at 832.

Given the updated values from the application of the training model, learning of learning model values can also be done at 840. Generally, this learning is done utilizing the methods described herein and result in updated values for parameter variables such as item applicability (842), item difficulty (844), transitional probabilities (846) and observational probabilities (848). Having learned update values for the learning model parameter variables, these updated values can be used to update the training model at 850 so that the updated values can be used by the learning model when it is applied again. The updated values of the learning model may be stored in a database at 853 to be used for the learning model later. As shown at 840, the process may be exited and finished.

One Embodiment of the Automated Learning System for a Training Model of an Adaptive Trainer:

One embodiment of the automated learning system for a training model generally comprises the functional elements of the embodiment discussed above in a software program product to be executed by a computer implemented system.

As will be readily apparent to those skilled in the art, automated learning systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 5:
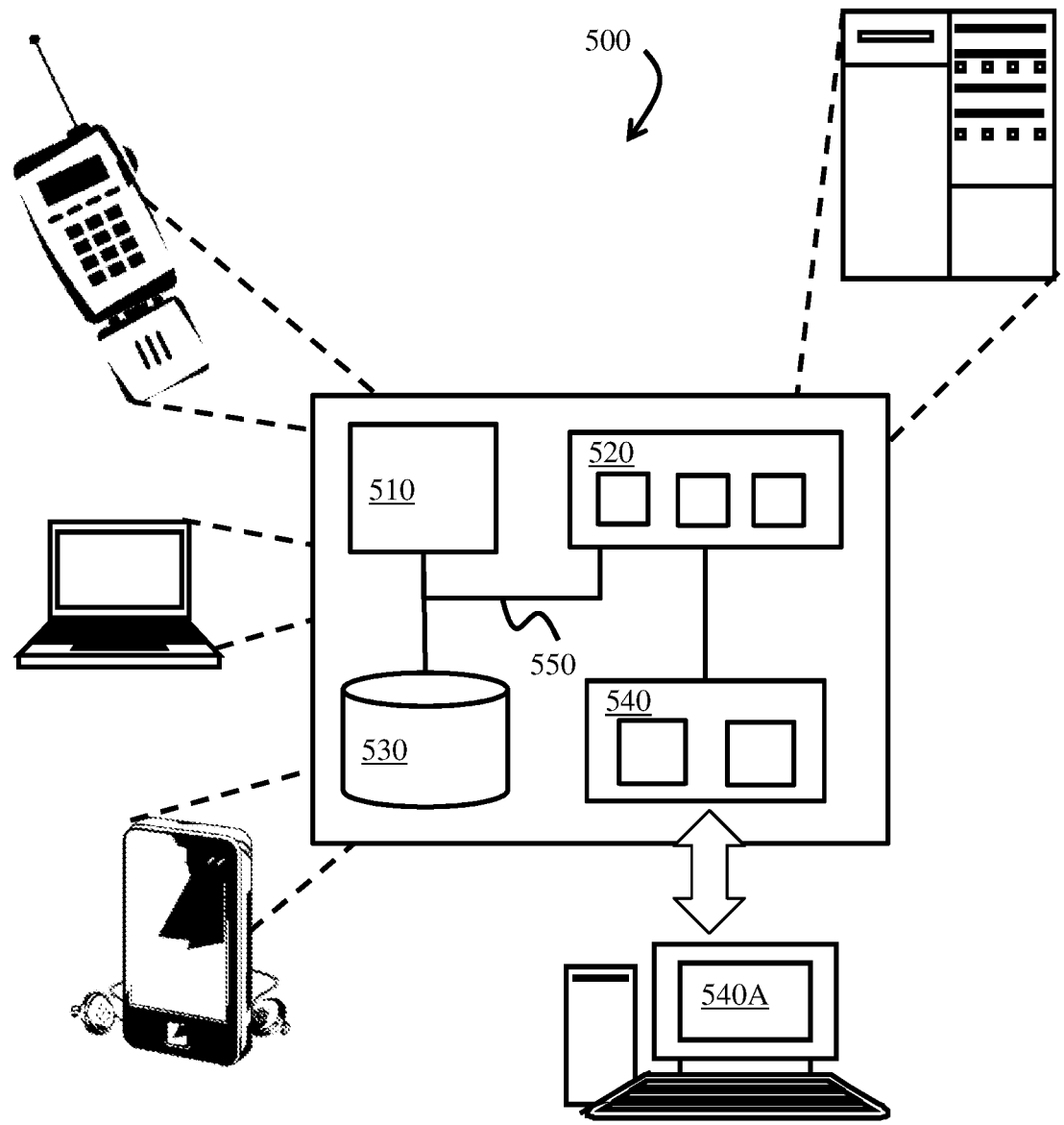
FIG. 5 illustrates one example embodiment of a computer system suitable for an automated learning system.

FIG. 5 is a schematic diagram of one embodiment of a computer system 500 by which the automated learning methods may be carried out. The computer system 500 can be used for the operations described in association with any of the computer implemented methods described herein. The computer system 500 includes at least one processor 510, a memory 520 and an input/output device 540. Each of the components 510, 520, and 540 are operably coupled or interconnected using a system bus 550. The computer system 500 may further comprise a storage device 530 operably coupled or interconnected with the system bus 550.

The processor 510 is capable of receiving the instructions and/or data and processing the instructions of a computer program for execution within the computer system 500. In some embodiments, the processor 510 is a single-threaded processor. In some embodiments, the processor 510 is a multi-threaded processor. The processor 510 is capable of processing instructions of a computer stored in the memory 520 or on the storage device 530 to communicate information to the input/output device 540. Suitable processors for the execution of the computer program instruction include, by way of example, both general and special purpose microprocessors, and a sole processor or one of multiple processors of any kind of computer.

The memory 520 stores information within the computer system 500. Memory 520 may comprise a magnetic disk such as an internal hard disk or removable disk; a magneto-optical disk; an optical disk; or a semiconductor memory device such as PROM, EPROM, EEPROM or a flash memory device. In some embodiments, the memory 520 comprises a transitory or non-transitory computer readable medium. In some embodiments, the memory 520 is a volatile memory unit. In another embodiments, the memory 520 is a non-volatile memory unit.

The processor 510 and the memory 520 can be supplemented by, or incorporated in, ASICs (application-specific integrated circuits).

The storage device 530 may be capable of providing mass storage for the system 500. In various embodiments, the storage device 530 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 530 comprises a transitory or non-transitory computer readable medium.

In some embodiments, the memory 520 and/or the storage device 530 may be located on a remote system such as a server system, coupled to the processor 510 via a network interface, such as an Ethernet interface.

The input/output device 540 provides input/output operations for the system 500 and may be in communication with a user interface 540A as shown. In one embodiment, the input/output device 540 includes a keyboard and/or pointing device. In some embodiments, the input/output device 540 includes a display unit for displaying graphical user interfaces or the input/output device 540 may comprise a touchscreen. In some embodiments, the user interface 540A comprises devices such as, but not limited to a keyboard, pointing device, display device or a touchscreen that provides a user with the ability to communicate with the input/output device 540.

The computer system 500 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the automated learning system may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

In some embodiments, the automated learning system may be integrated into computer based systems, such as computer based training simulators or other computer based training systems. In some embodiments, the computer based systems are specially designed computer systems specifically designed to function only as a computer based simulator or computer based training system. In such simulators and systems may be in communication with one or more input sources which can include various instruments and/or user interfaces to simulate the domain to be trained and transform and communicate a physical input to be used as input to the methods and systems disclosed. For example, and not for limitation, such input sources for an aircraft simulator may comprise one or more actual or simulated device such as an altimeter, GPS, pitot tube, gyroscope, accelerometer, magnetometer, flight data computer or other avionic devices. In some embodiments, the simulators are networked across a distributed digital communications network. In some embodiments, the computer based simulator or computer based training systems that train students using virtual environments. In some embodiments, the computer based simulator or computer based training systems may be combined with "live" live participants beyond the student or instructor. Live participants may be a physical source of data for providing training data. Live participants may have sensors that capture actual data, for example, broadcast their GPS position or broadcast their communications, both of which could be used as training data for the disclosed automated learning systems and methods. These participants may not use computers.

In some embodiment, the disclosed systems and methods for automated learning utilize multiple KSAs, multiple TOs, and multiple measures per student, across multiple items.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A computer implemented machine learning system for a training model of a processor based adaptive trainer, the system comprising:
   a training model comprising a set of model parameters comprising:
      a skill having one or more skill levels,
      a training item having a first model parameter variable of a training item difficulty for the skill and a second model parameter variable of a training item applicability for the skill,
      a transition function, and
      an observation function;
   the training model further comprising a set of model variables:
      a skill level variable representing a skill level value of a student at a time;
      a training measure variable representing a performance data value of the student on a training item;
   the training model further comprising a computer program code configured to implement the method of:
      determining a set of initial values for the set of model variables comprising:
         an initial performance data value of the student for the training item, and
         an initial skill level value of the student for the training item;
      determining a set of initial values for the model parameter variables comprising:
         an initial training item difficulty value for the training item, and
         an initial training item applicability value for the training item;
      receiving an updated performance data value of the student for the training item;
      determining an updated skill level value of the student for the training item;
      determining a set of updated values for the model parameter variable values comprising:
         an updated training item difficulty value for the training item, and
         an updated training item applicability value for the training item;
      iterating the method to determine a learned training item difficulty value for the training item and a learned training item applicability value for the training item; and
      storing the learned training item difficulty value for the training item and a learned training item applicability value for the training item in a database.

2. The computer implemented machine learning system of claim 1 wherein the transition function represents a probabilistic relationship between a first skill level value of the student before a student performs a training item and a second skill level of the student after the student performs the training item.

3. The computer implemented machine learning system of claim 1 wherein the observation function represents a probabilistic relationship between the performance data value after the student performs the training item and a second skill level value of the student after the student performs the training item.

4. The computer implemented machine learning system of claim 1 wherein the updated performance data value is a student performance data value in an adaptive trainer.

5. The computer implemented machine learning system of claim 1 wherein the computer program code method step of iterating the method to determine a learned training item difficulty value for the training item and a learned training item applicability value for the training item comprises iterating the method according to an Item Response Theory (IRT) algorithm to determine a learned training item difficulty value for the training item and a learned training item applicability value for the training item.

6. The computer implemented machine learning system of claim 1 wherein the computer program code method further comprising:
   providing a subset of the model parameters to a learning model;
   determining an instructional model from the learning model; and
   providing one or more training recommendations based upon the instructional model.

7. The computer implemented machine learning system of claim 6 wherein the learning model comprises a Partially Observable Markov Decision Process (POMDP) model.

8. A computer implemented machine learning system for a training model of an adaptive trainer, the system comprising:
   a training model comprising a set of model parameters comprising:
      a skill having one or more skill levels,
      a training item having a first model parameter variable of a training item difficulty for the skill and a second model parameter variable of a training item applicability for the skill,
      a transition function, and
      an observation function;
   the training model further comprising a set of model variables:
      a skill level variable representing a skill level value of a student at a time;
      a training measure variable representing a performance data value of the student on a training item;
   the training model further comprising a computer program code configured to implement the method of:
      determining a set of initial values for the set of model variables comprising:
         an initial performance data value of the student for the training item, and
         an initial skill level value of the student for the training item;
      determining an initial value for the transition function comprising an initial training item transitional probability value for the skill level for the training item;
      receiving an updated performance data value of the student for the training item;
      determining an updated skill level value of the student for the training item;
      determining an updated value for the transition function comprising an updated training item transitional probability value for the skill level for the training item;
      iterating the method to determine a learned training item transitional probability value for the skill level for the training item; and
      storing the learned training item transitional probability value for the skill level for the training item in a database.

9. The computer implemented machine learning system of claim 8 wherein the transition function represents a probabilistic relationship between a first skill level value of the student before a student performs a training item and a second skill level of the student after the student performs the training item.

10. The computer implemented machine learning system of claim 8 wherein the observation function represents a probabilistic relationship between the performance data value after the student performs the training item and a second skill level value of the student after the student performs the training item.

11. The computer implemented machine learning system of claim 8 wherein the updated performance data value is a student performance data value in an adaptive trainer.

12. The computer implemented machine learning system of claim 8 wherein the computer program code is configured to implement the method further comprising:
   providing the learned training item transitional probability value to a learning model;
   determining an instructional model from the learning model; and
   providing one or more training recommendations based upon the instructional model.

13. A computer implemented method of automatically defining an updated training variable parameter for a training model of an adaptive trainer, the method comprising:
   determining a set of initial values for a set of training model variables comprising:
      an initial performance data value of the student for a training item, and
      an initial skill level value of the student for the training item;
   determining an initial value for a transition function comprising an initial training item transitional probability value for a skill level for the training item;
   receiving an updated performance data value of the student for the training item;
   determining an updated skill level value of the student for the training item;
   determining an updated training item transitional probability value for the skill level for the training item;
   iterating the method to determine a learned training item transitional probability value for the skill level for the training item; and
   storing the learned training item transitional probability value for the skill level for the training item in a database.

14. The computer implemented method of claim 13 wherein the transition function represents a probabilistic relationship between a first skill level value of the student before a student performs a training item and a second skill level of the student after the student performs the training item.

15. The computer implemented method of claim 13 wherein the updated performance data value is a student performance data value in an adaptive trainer.

16. The computer implemented method of claim 13 wherein the step of iterating the method to determine a learned training item transitional probability value for the skill level for the training item comprises iterating the method according to an Item Response Theory (IRT) algorithm to determine a learned training item transitional probability value for the skill level for the training item.

17. The computer implemented method claim 13 further comprising:
   providing the learned training item transitional probability value to a learning model;
   determining an instructional model from the learning model; and
   providing one or more training recommendations based upon the instructional model.

18. The computer implemented method of claim 17 wherein the learning model comprises a Partially Observable Markov Decision Process (POMDP) model.

* * * * *